United States Patent [19]
Furuhashi et al.

[11] Patent Number: 5,327,989
[45] Date of Patent: Jul. 12, 1994

[54] FOUR-WHEELED BUGGY

[75] Inventors: Hitoshi Furuhashi; Akio Handa; Toru Iiizumi, all of Saitama; Hisahiro Komori, Tokyo; Kozo Yamada, Saitama; Hiroyuki Kido, Saitama; Yutaka Murata, Saitama; Tatsuo Masuda, Saitama, all of Japan

[73] Assignee: Honda Giken Kogyo Kabushiki Kaisha, Tokyo, Japan

[21] Appl. No.: 855,501

[22] Filed: Mar. 20, 1992

[30] Foreign Application Priority Data

Mar. 20, 1991 [JP] Japan .................................. 3-081975
Mar. 20, 1991 [JP] Japan .................................. 3-081976
Mar. 20, 1991 [JP] Japan .................................. 3-081977

[51] Int. Cl.⁵ .......................................... B60K 17/344
[52] U.S. Cl. .................................. 180/248; 180/90.6; 180/311; 180/908; 180/292; 296/204; 280/667
[58] Field of Search ............... 180/908, 246, 248, 254, 180/311, 90.6, 292; 280/667; 296/204, 205, 194

[56] References Cited

U.S. PATENT DOCUMENTS

| | | | |
|---|---|---|---|
| 2,089,598 | 8/1937 | Cavanagh et al. | 180/90.6 |
| 3,638,748 | 2/1972 | Tixier | 296/204 X |
| 3,765,698 | 10/1973 | Burrell | 180/254 X |
| 4,620,715 | 11/1986 | Takahashi | 180/254 X |
| 4,749,211 | 6/1988 | Kosuge . | |
| 4,773,661 | 9/1988 | Kosuge . | |
| 4,773,675 | 9/1988 | Kosuge . | |
| 4,798,400 | 1/1989 | Kosuge . | |
| 4,799,708 | 1/1989 | Handa et al. | 296/205 X |
| 4,832,399 | 5/1989 | Kosuge . | |
| 4,946,193 | 8/1990 | Oka | 180/908 X |
| 5,057,062 | 10/1991 | Yamasaki et al. | 180/248 X |

FOREIGN PATENT DOCUMENTS

| | | | |
|---|---|---|---|
| 993067 | 10/1951 | France | 180/254 |
| 271126 | 12/1986 | Japan | 180/908 |
| 62-163136 | 10/1987 | Japan . | |
| 63-20284 | 1/1988 | Japan . | |
| 106184 | 5/1988 | Japan | 296/204 |
| 2-158421 | 12/1988 | Japan . | |
| 215687 | 8/1989 | Japan | 180/311 |
| 2-109727 | 6/1990 | Japan . | |
| 727917 | 4/1955 | United Kingdom | 180/248 |

Primary Examiner—David M. Mitchell
Assistant Examiner—Gary C. Hoge

[57] ABSTRACT

In a four-wheeled buggy which has a pair of front wheels and a pair of rear wheels and a seat arranged around the middle of the vehicle to enable the rider to operate the vehicle in a sitting posture thereon, a pair of right and left main frames are two-dimensionally bent upwardly at the forward sections thereof and adapted to support at the front ends thereof a front wheel axle so as to prevent a front wheel driving device from hitting ground. The rearward sections of the main frames extend horizontally rearwardly to define a lowermost height from ground and are adapted to support a power unit behind the seat close to the rear wheels so as to obtain mass concentration.

15 Claims, 35 Drawing Sheets

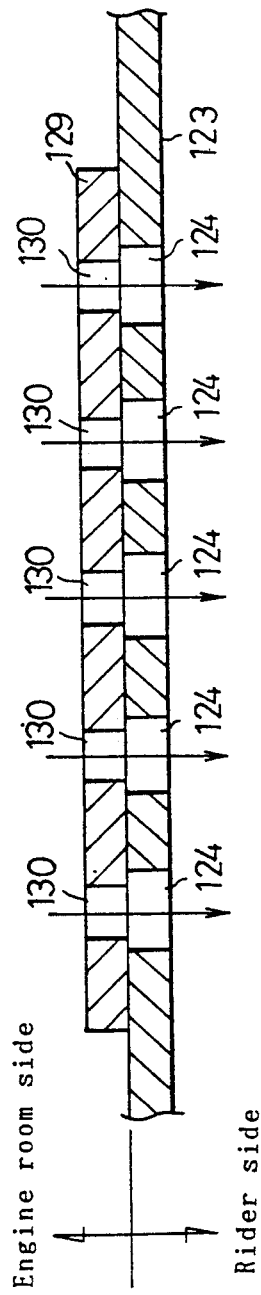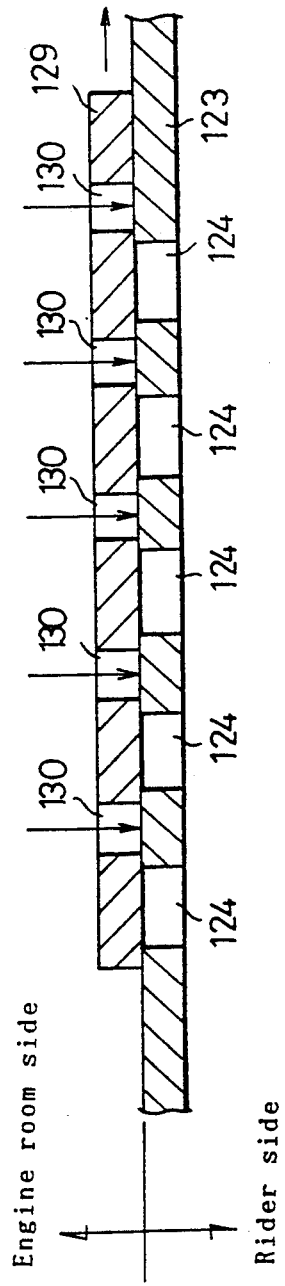

FOUR-WHEELED BUGGY

BACKGROUND OF THE INVENTION

1. Field of the Invention

The present invention relates to a four-wheeled buggy, and more particularly to a body construction of a power-driven four-wheeled buggy provided with each pair of front and rear wheels.

2. Description of the Prior Art

A four-wheeled buggy is known for use as an all terrain vehicle for travelling on a pasture, farm, dune, wasteland or the like. The U.S. Pat. Nos. 4,749,211, 4,773,661, 4,773,675, 4,798,400 and 4,832,399 disclose body constructions in use for such kinds of four-wheeled buggies. In these four-wheeled buggies, a pair of right and left parallel main frames extend rectilinearly in a forward and backward direction of the vehicle and support on the front end thereof a pair of front wheels in such a way as to permit steering through an independent suspension device. On the rear end of the main frames an internal combustion engine and a transmission as a power device are supported in a forwardly and backwardly extending state and a pair of rear wheels are carried through a suspension device at the rear of the transmission. The front or rear wheels are adapted to be driven by power from the internal combustion engine. With respect to the engine, a crank shaft extends laterally to be normal to the travelling direction of the vehicle.

The main frames are formed of large-sized rectangular pipe and above the intermediate points of the main frames a bench type seat is arranged in such a manner that the driver operates the vehicle in a sitting posture thereon. From the viewpoint of strength it is preferable to extend the main frames in close vicinity to the front wheels and to the rear wheels. In the conventional vehicle constructions, however, the rear wheels are carried remote from the main frames, and thus it is required to have the front wheels and the rear wheels arranged close to the main frames. Further, component parts for driving and steering the front wheels are arranged generally around and beneath the front ends of the main frames to be at the lowermost height from the ground, so that these parts will be susceptible to hitting the ground due to unevenness thereof, for example, when the vehicle travels on the wasteland. Therefore, if the distance from ground is elevated increased, the seat will be arranged at the higher position because of the horizontally straight configuration of the main frames, thereby incurring the difficulty in getting on and off of the vehicle and thereby causing a center of gravity of the vehicle to go up. As described above, such large-sized main frames are manufactured generally in a straight configuration in view of precision and cost so as to make getting on and off operations difficult and the center of gravity elevated. It is therefore desirable to provide such a main frame construction as not only to enable the rider to easily get on and off the vehicle but also to meet the requirements of a lower center of gravity and of more competent manufacturing. Furthermore, the longitudinally extending power device makes the vehicle longer and the mass concentration of the vehicle disadvantageous, whereby the vehicle may not be compact in construction. Accordingly, it is also desirable to provide as compact vehicle construction as possible to ensure a high driveability.

SUMMARY OF THE INVENTION

In view of the afore-mentioned, an object of the present invention to provide an improved four-wheeled buggy which meets all the requirements mentioned above.

To this end, according to the present invention, there is provided a four-wheeled buggy comprising a pair of right and left main frames extending in parallel with each other along a central longitudinal axis of a vehicle, a pair of right and left front wheels being supported on each front end of the main frames, a pair of right and left rear wheels being supported on each rear side of the main frames, a power unit for driving the vehicle being carried on the main frames, a front wheel steering device being arranged around the front ends of the main frames, and a seat being arranged above and around the middle of the main frames so as to enable the rider to operate the vehicle in a sitting posture on it, characterized in that pair of main frames extend straight, as viewed from above, along and in the vicinity of each lateral side of the vehicle, a span between the parallel main frames being defined substantially the same as a lateral width of the seat, such that each of the main frames, as viewed from the side thereof, is two-dimensionally bent forwardly upwardly at the middle thereof, where the seat is supported, and is positioned at the front end thereof above a front wheel axle to support the same thereunder, a,d that each rearward section of the main frames extends substantially horizontally to carry the power device thereon, pair of the roar wheels being suspended at each lateral side of and in the vicinity of the power device, and the horizontally extending rearward sections of the main frames adapted to define a lowermost height of the vehicle body from ground. With this arrangement of the present invention, it is possible to have arranged the main frames close to the front and rear wheels thereby enabling the vehicle body to be competent in strength. The forward sections of the main frames are two-dimensionally bent upwardly from the middle of the main frames so that the lowermost height thereof from ground may be elevated so as to possibly prevent the front wheel suspension device and the front wheel axle therearound from hitting the ground. Further, a lowermost height from ground is kept at a lower level by the horizontally extending rearward sections of the main frames so as to enable the rider to easily get on and off the vehicle and the center of gravity of the vehicle are lowered. Also, as each of the main frames is formed by a two-dimensional bending process, it may be easily and precisely obtained so as to be low in cost and high in reliability.

In one aspect of the present invention, the power device is constituted with an internal combustion engine wherein a crankshaft is installed in parallel with the travelling direction of tile vehicle. With tills arrangement, a length of the power device in a forward and backward direction of the vehicle may be diminished. Accordingly, the power device can be mounted around the center of the vehicle thereby attaining a mass concentration. Further, this longitudinally diminished power device may contribute to a compact construction of the vehicle which enhances driveability.

The above and other related objects and features of the present invention will be apparent from the following description of the disclosure when the same is read in connection with the accompanying drawings.

BRIEF DESCRIPTION OF THE DRAWINGS

FIG. 22 is a cross sectional view taken along line XXII—XXII of FIG. 20;

DETAILED DESCRIPTION OF THE PREFERRED EMBODIMENTS

Figure 1:
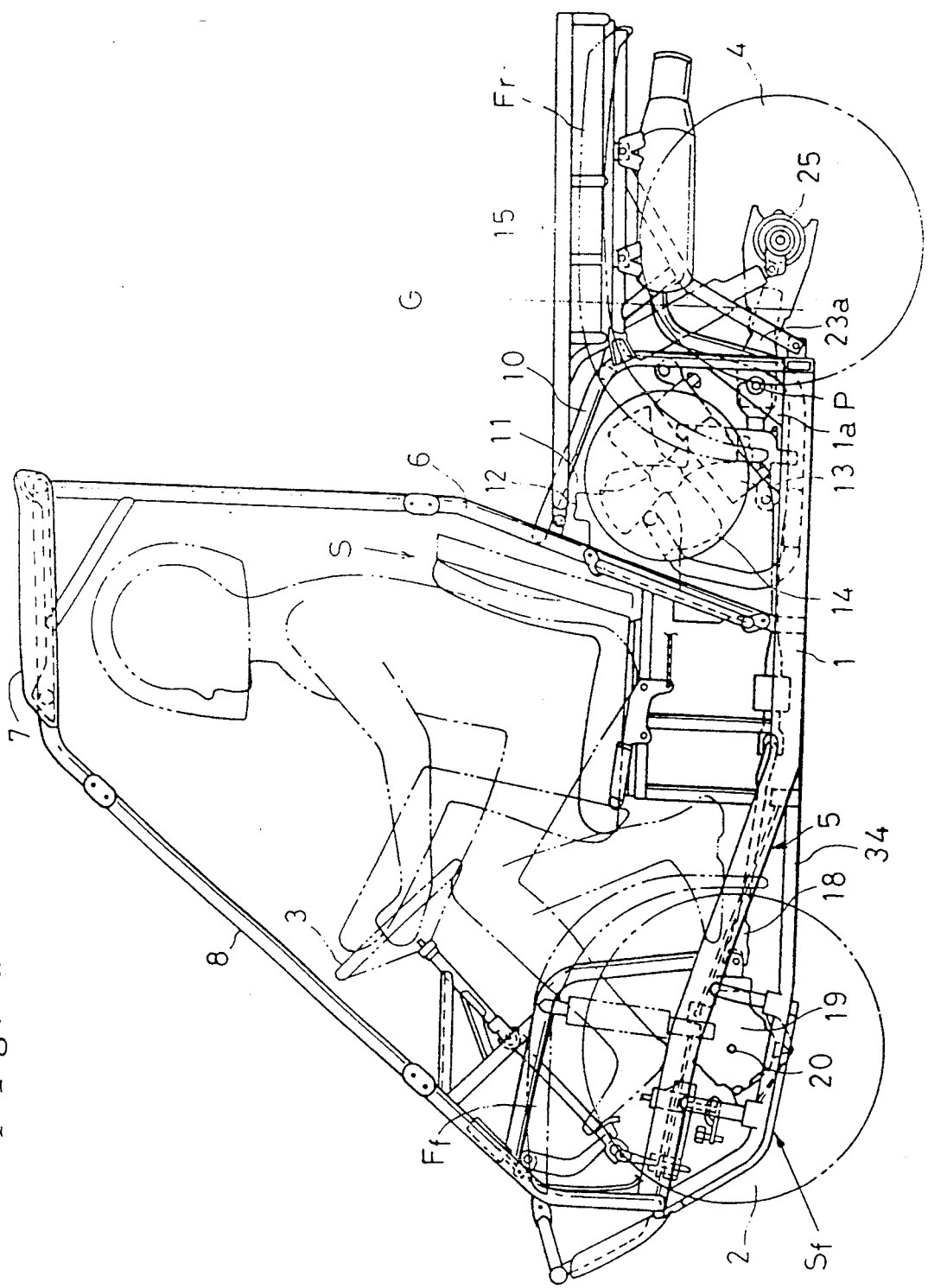
FIG. 1 is a side elevational view of a first embodiment for explaining an entire construction of a four-wheeled buggy according to the present invention.
Figure 2:
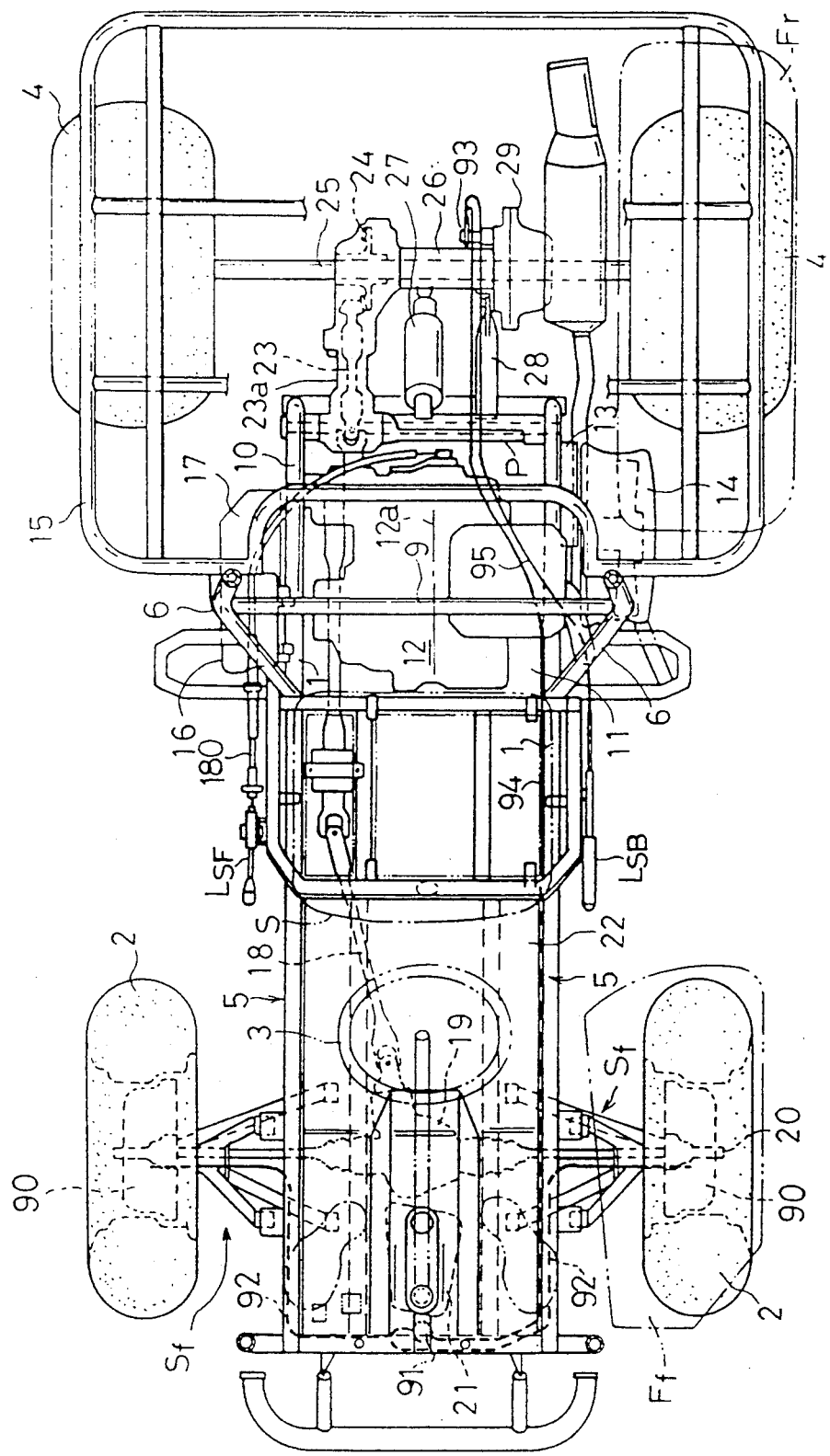
FIG. 2 is a partially schematic top plan view thereof.
Figure 3:
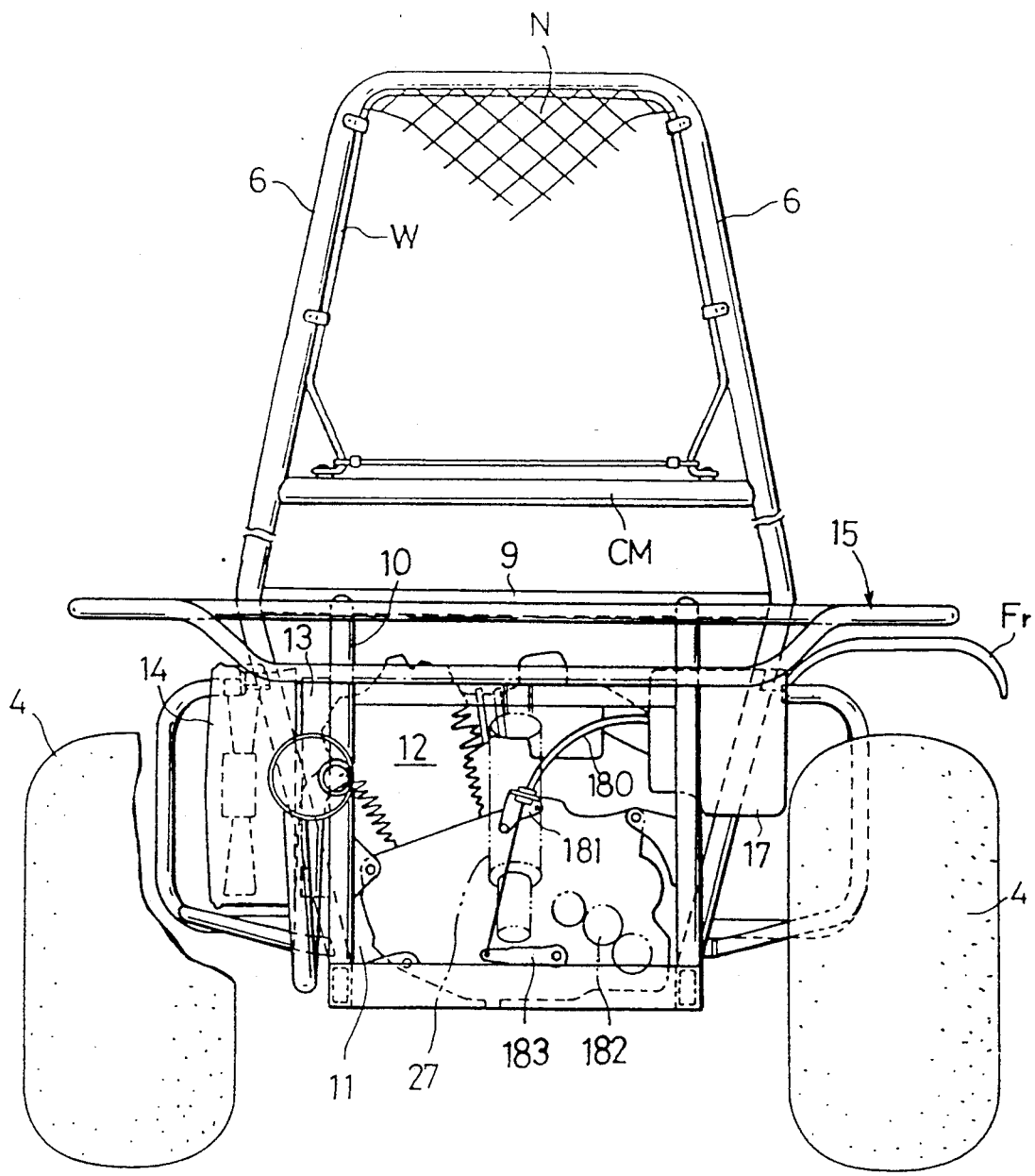
FIG. 3 is a partially schematic and partially cutaway rear elevational view thereof.

Preferred embodiments of the present invention will be described hereinafter with reference to the accompanying drawings, wherein like reference numerals designate like or corresponding parts throughout. Referring first to FIGS. 1 through 3, an entire construction of a four-wheeled buggy is illustrated as a first embodiment of the invention. In these illustrations, a pair of main frames 1 and 1 extend in parallel with each other and longitudinally with respect to a vehicle body so as to form a generally ladder-shaped frame. Around the middle of the parallel main frames 1 and 1 a seat S is carried. The pair of the main frames 1 and 1 are formed generally of a comparatively large-sized square or rectangular metallic pipe and at each right and left side of the front part thereof a pair of front wheels 2 and 2 adapted to be operated through a steering handle 3 are supported through a front wheel suspension apparatus Sf of double wishbone type. A space between the parallel main frames 1 and 1 is defined substantially the same as a lateral width of the seat S. A pair of rear wheels 4 and 4 are suspended on the right and left sides of the rear part of the main frames 1 and 1. For these front and rear wheels 2, 2, 4 and 4 are used conventional balloon tires which are suitable for travelling on all terrains such as a pasture, farm, dune or wasteland. Above the front and rear wheels 2, 2, 4 and 4 are provided front fenders Ff and Ff, and rear fenders Fr and Fr, each mounted on the main frames 1 and 1 to project laterally outwardly therefrom. The main frames 1 and 1 are bent forwardly upwardly at the middle thereof respectively, as viewed from the side thereof like FIG. 1 so as to be formed with upwardly inclined forward frame sections 5 and 5 while they extend rearwardly horizontally from the middle bent portion thereof so as to be the lowermost height above ground. As viewed from above, each of the main frames 1 and 1 extends straight in a forward and rearward direction and is manufactured by a two-dimensional bending process.

A rear roll bar 6 of generally inverted U-shape extends vertically upwardly at the intermediate points of the main frames 1 and 1 and at the rear of the seat S to be bridged over between the main frames 1 and 1. The rear roll bar 6 is connected at the top end thereof through a roof 7 with a pair of right and left front roll bars 8 and 8 which extend obliquely upwardly and rearwardly from the front end of the main frames 1 and 1 toward the roof 7, thereby defining a driving compartment space. As shown in FIG. 3, there is provided on the rear roll bar 6 a head net N for supporting a rider's head. The head net N is spread out with a wire W of generally inverted U-shape which is arranged along the rear roll bar 6. The right and left lower ends of the wire W are fixed on a cross member CM which extends between right and left poles of the rear roll bar 6. Under the cross member CM a cross pipe 9 is bridged between the right and left poles of the rear roll bar 6 and a pair of parallel reinforcing pipes 10 and 10 are adapted to connect the cross pipe 9 with each rear end of the parallel main frames 1 and 1 in such a manner that the cross pipe 9 and the reinforcing pipes 10 and 10 define an engine room 11 behind the seat S along with the main frames 1 and 1. An engine 12 as a power unit is arranged within the engine room 11, directing the longitudinal axis thereof to the lateral sides of the vehicle. The engine 12 is not shown in detail in the drawings but is an internal combustion engine of such a known type that a crankshaft is rotated through a piston which reciprocates within a cylinder. An axis 12a of the crankshaft extends in parallel with the longitudinal axis of the vehicle in the travelling direction thereof.

As apparent from FIG. 2, at the left side of the engine 12 there are disposed a radiator 13 and a cooling fan 14 side by side. Above tile engine room 11 a rear carrier 15 is arranged to extend substantially horizontally rearwardly from the neighborhood of the seat S. A battery 16 and an air cleaner 17 are arranged at the right side of the engine 12 in such a way that the battery 16 is supported on the right main frame 1 and the air cleaner 17 is supported on the reinforcing pipe 10. The engine is adapted to drive the front wheels 2 and 2 through the intermediary of a front propeller shaft 18, a front differential device 19 and a front wheel axle 20. This front wheel driving apparatus and a steering gearbox 21 as a part of a front wheel steering apparatus are covered with a step floor 22 which spreads over from the front ends of the main frames 1 and 1 rearwardly to the front of the seat S.

A rear propeller shaft 23 is capable of driving the pair of the rear wheels 4 and 4 through the intermediary of a transmission gear 24 and a rear wheel axle 25. A reference numeral 26 designates a rear axle holder for supporting an intermediate portion of the rear wheel axle 25. Reference numerals 27, 28 and 29 designate a rear cushion, a rear swing arm and a rear brake, respectively. A transmission case 23a, accommodating the rear propeller shaft 23 therein, and the rear swing arm 28 are pivotably supported at each front distal end thereof on a pivot shaft P which is transversely provided close to the rear surface of the engine 12. The pivot shaft P is carried at the right and left ends thereof on a pair of pivot plates 1a which are provided on a right and a left angularly connected corners between each rear end of the main frames 1 and each lower end of the reinforcing pipes 10. With the arrangement as mentioned above, the rear wheels 4 and 4 are positioned close to the right and left sides of the engine 12.

Figure 4:
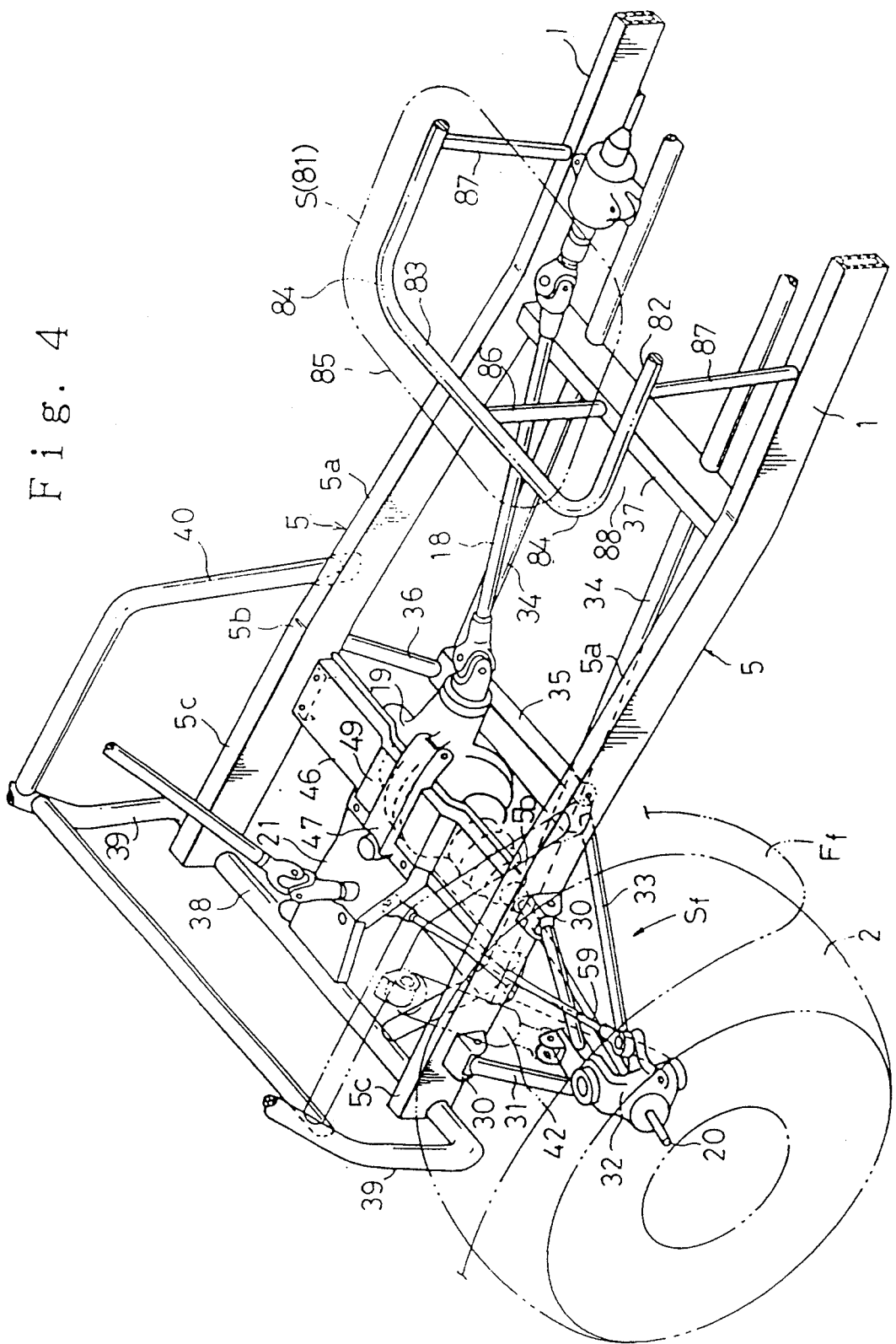
FIG. 4 is a partial perspective view of an essential part thereof showing a front wheel steering device, a front wheel driving device and a front wheel suspension device.
Figure 5:
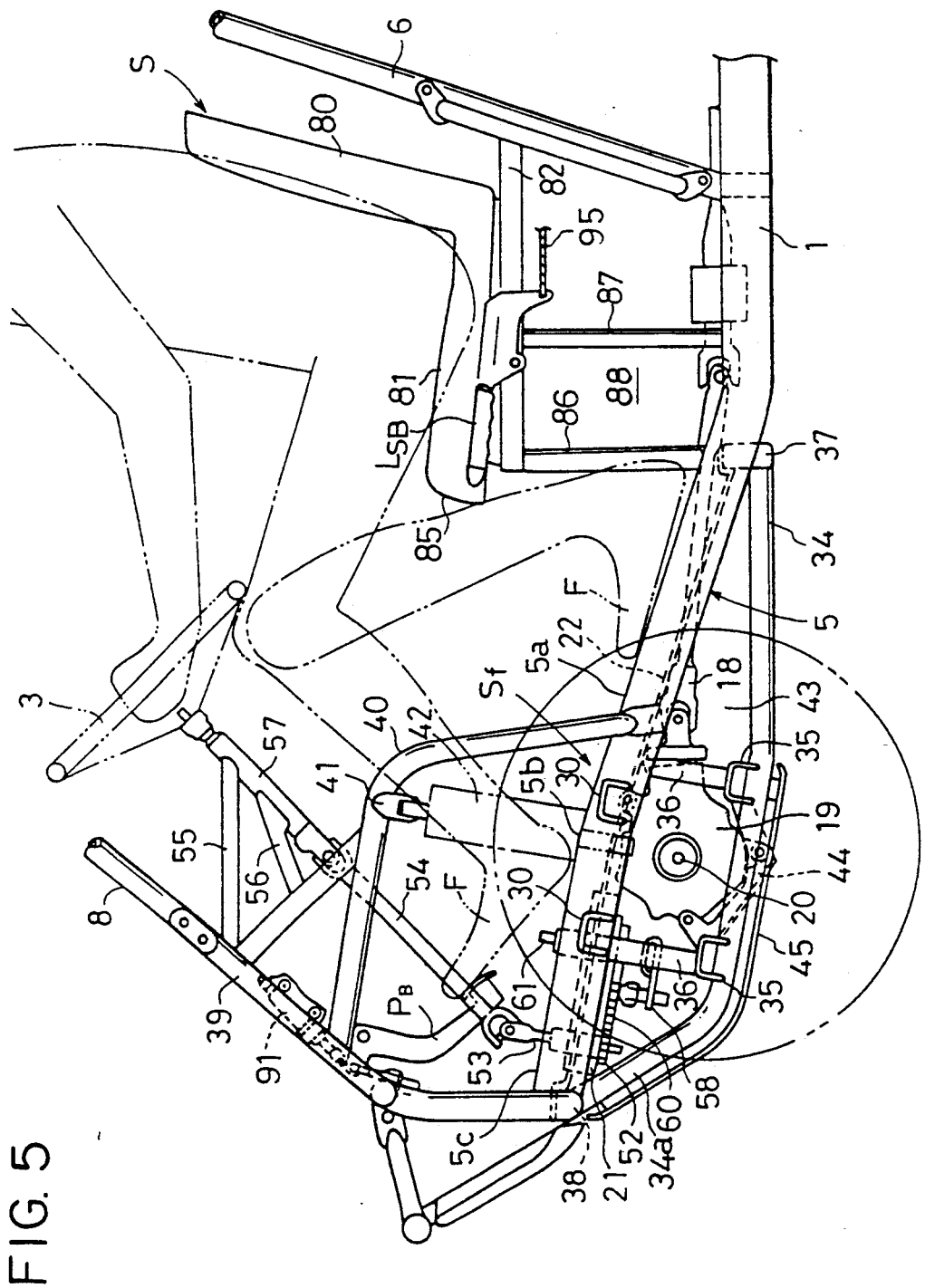
FIG. 5 is a side view of FIG. 4.

Next, the front wheel suspension apparatus Sf will be explained with reference to FIGS. 4 through 7. As shown in FIGS. 4 and 5, the forward frame sections 5 and 5 extend rearwardly downwardly to the support portions of the seat S in such a state that a rear portion 5a located rearwards from an intermediate bent portion 5b is formed larger in inclination than a front portion 5c located forwards therefrom. On the outer lateral surface of each forward frame section 5 are welded a pair of front and rear arm brackets 30 and 30 on which a pair of right and left upper arms 31 and 31 are mounted at the respective basal ends thereof. Each distal end of the upper arms 31 and 31 is connected with right and left knuckle arms 32 and 32 provided on the right and left front wheels 2 and 2. Similarly, a pair of right and left lower arms 33 and 33 which constitute the front wheel suspension apparatus Sf of double wishbone type with the upper arms 31 and 31 are mounted at each outer distal end thereof on the right and left knuckle arms 32 and 32, respectively. Each inner basal end of the lower arms 33 and 33 is connected to front and rear cross members 35 and 35. The cross members 35 and 35 are transversely mounted on and between a pair of right and left sub-frames 34 and 34 which extend below and between the forward frame sections 5 and 5 of the main frames 1 and 1 longitudinally in parallel therewith. The right and left ends of each cross member 35 are connected through joint pipes 36 and 36 to the main frames 1 and 1. As viewed from the front like FIG. 7, there is formed an inverted equilateral trapezoid by connecting four points A, B, C and D, wherein the points A and B are junctions between each lower arm 33 and each end of the cross members 35 and 35 and the points C and D are positioned at the respective centers of the forward frame sections 5 and 5. Thus, in the double wishbone construction, the upper arms 31 and 31 are constituted shorter than the lower arms 33 and 33. As shown in FIG. 5, the pair of the sub-frames 34 and 34 extend forwardly substantially horizontally under the forward frame sections 5 and 5 from a central cross member 37 and are bent upwardly at an acute angle at the forward ends thereof so as to be fixedly connected with a front cross pipe 38. The central cross member 37 is provided under the seat S to extend between the right and left main frames 1 and 1. The front cross pipe 38 is fixedly secured to the front distal ends of the forward frame sections 5 and 5 and formed at each lateral end thereof with a pair of upright extensions 39 and 39 which are adapted to be connected with the lower portions of the front roll bars 8 and 8, The upright extensions 39 and 39 are connected to the rear portions 5a and 5a of the forward frame sections 5 and 5 through a pair of L-shaped pipes 40 and 40 each of which is provided at the shoulder portion thereof with a cushion bracket 41. A pair of right and left front cushions (shock absorbers) 42 and 42 are arranged between each of the cushion brackets 41 and 41 and each of the right and left knuckle arms 32 and 32.

Figure 6:
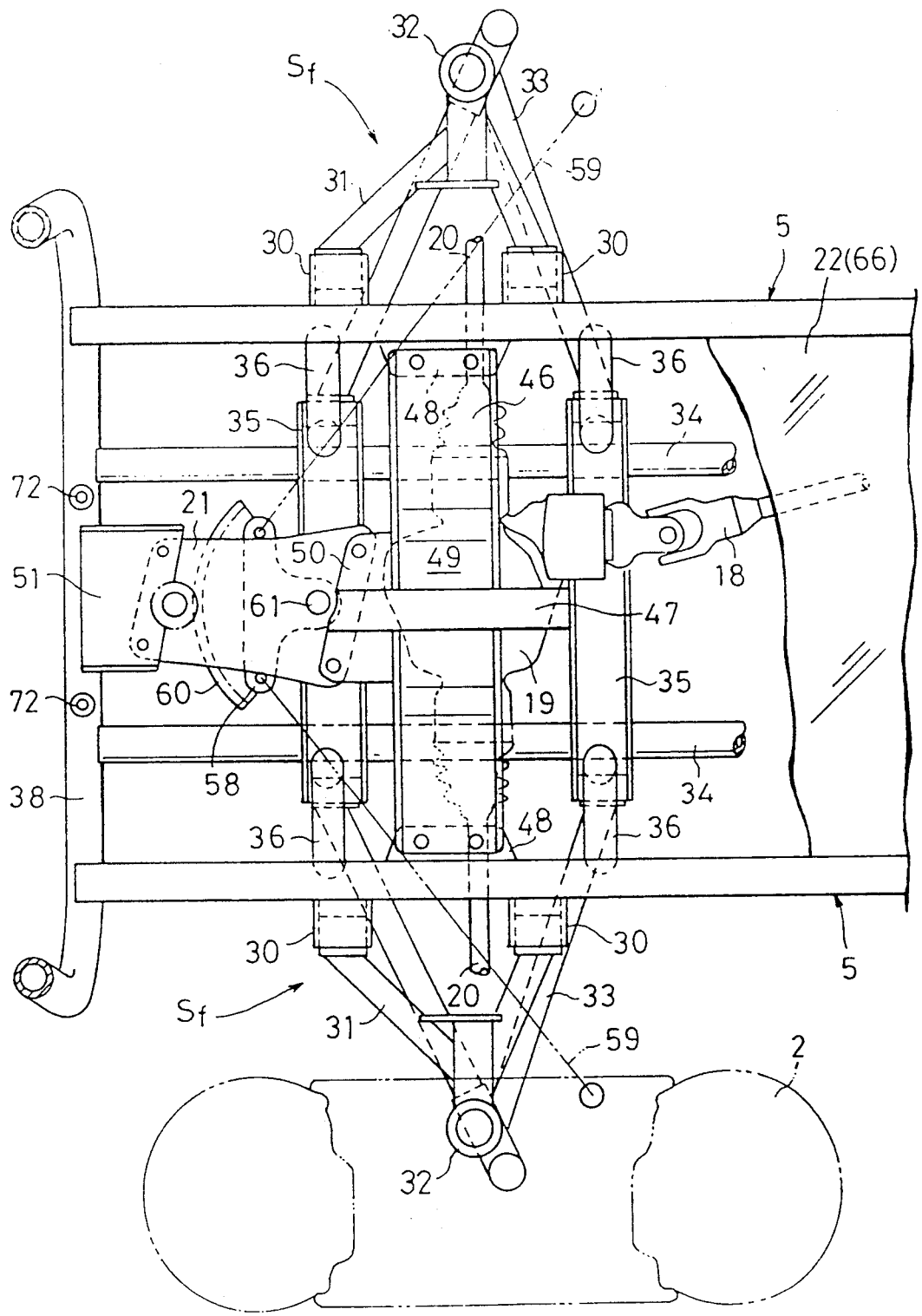
FIG. 6 is a partially cutaway plan view thereof.

The arrangement of the front wheel driving apparatus and a front wheel steering apparatus are explained hereunder. As clearly shown in FIG. 5, between the forward frame portions 5 and 5 and the sub-frames 34 and 34 are formed a substantially triangular shaped space 43 within which are arranged the front propeller shaft 18, the front wheel differential device 19, the front wheel axle 20 and the steering gearbox 21. These members are surrounded at the right and left sides thereof by the forward frame sections 5 and 5, the sub-frames 34 and 34, and a pair of right and left joint pipes 36 and 36 and at the under side thereof by the sub-frames 34 and 34, an under cover 44 and a skid plate 45. The front of these members are surrounded by upwardly standing front portions 34a and 34a and the skid plate 45. The sub-frames 34, the joint pipes 36, the under cover 44 and the skid plate 45 constitute a frame reinforcement means. The front wheel differential device 19 is supported on the front and rear cross member 35 and 35 and covered with the under cover 44. The skid plate 45 is detachably arranged between the sub-frames 34 and 34 to extend from the under side of the differential device 19 to the front cross pipe 38. Tile skid plate 45 is adapted to define a lowermost height from ground at an area located under the front wheel differential device 19 which area, as apparent from FIG. 5, is positioned substantially at the same level as the horizontal extensions of the sub-frames 34 and 34. Accordingly, such component members as the front wheel differential device 19 and the like accommodated above the skid plate 45 are positioned at a higher level than the lowermost height from ground. As seen in FIGS. 4 and 6, the front wheel differential device 19 is fixedly mounted at the upper wall of the casing thereof on a longitudinally extending bridge member 47 which crosses over the middle of an upper cross member 46 extending between the forward frame sections 5 and 5 of the main frames 1 and 1. The upper cross member 46 is provided to cover the upper areas of the front wheel axle 20 and the front wheel differential device 19 and fastened at both ends thereof on each bracket 48 welded on each inner lateral wall of the forward frame sections 5 and 5. At the middle of the upper cross member 46, there is formed an upward protrusion 49 for having the front wheel differential device 19 arranged thereunder. The bridge member 47 is welded at the middle thereof on the upward protrusion 49 and adapted to support at the front distal end thereof the rear portion of the steering gearbox 21 along with a bracket 50 provided on the upper cross member 46. As shown in FIGS. 4, 5 and 6, the steering gearbox 21 is located in front of the front wheel differential device 19 and supported at the front end thereof on a bracket 51 welded on the front cross pipe 38.

The front wheel steering apparatus, as clearly seen in FIG. 5, comprises the steering gearbox 21, a steering shaft 54 whose lower end is connected with a gear shaft 53 of a steering gear 52, a steering column 57 which rotatably supports the steering shaft 54 and is connected through stays 55 and 56 with the upright portions 39 and 39, the steering wheel 3, and, as shown in FIGS. 4 through 7, a pair of tie rods 59 and 59, or the like. These tie rods 59 and 59 cross the front wheel axle 20 to connect a link plate 58 of the steering gearbox 21 with the right and left knuckle arms 32 and 32 so as to ensure a large steering angle. A reference numeral 60 designates a sector gear which is meshed with the steering gear 52 and rotates through a shaft 61 coaxially with respect to the link plate 58.

Figure 7:
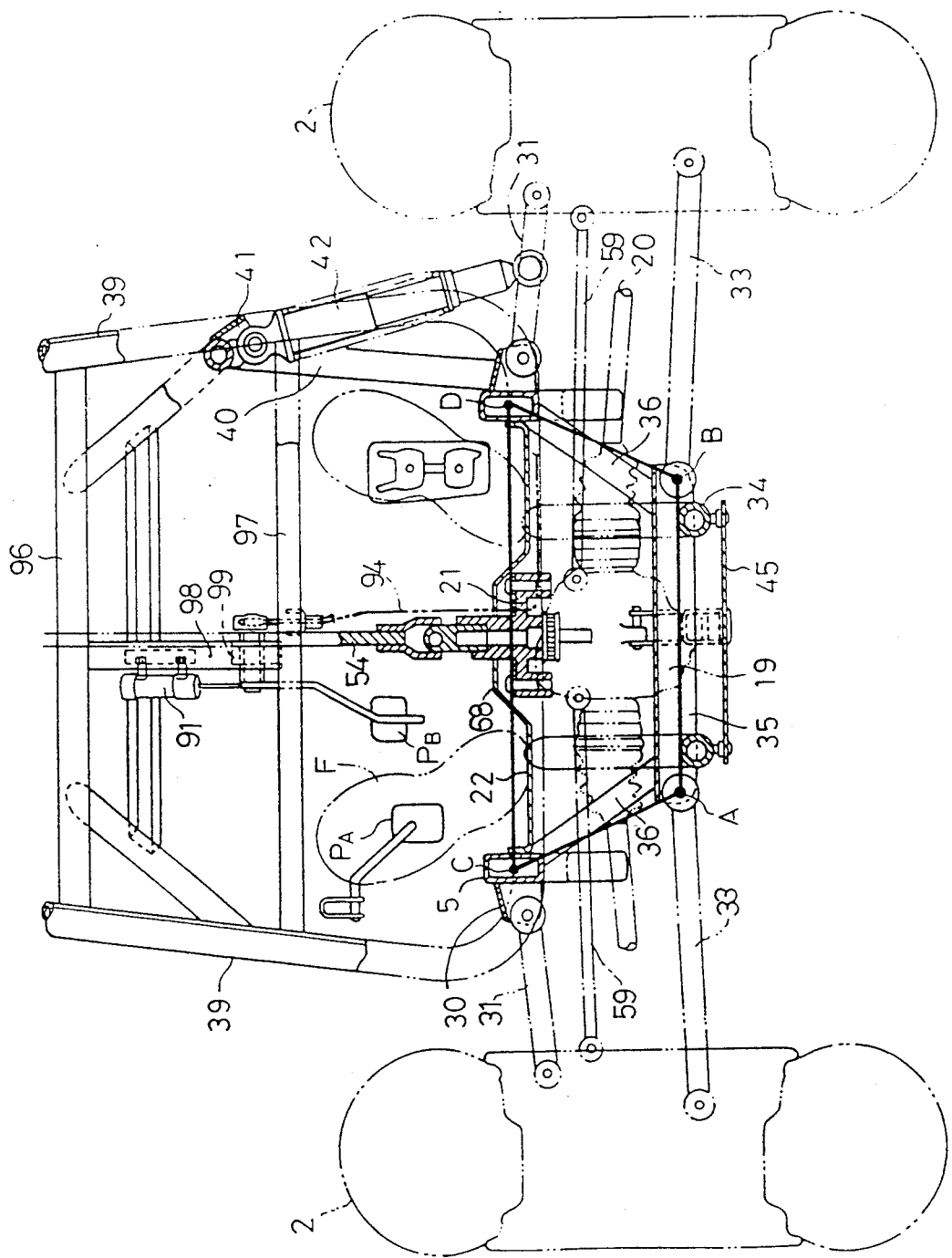
FIG. 7 is a transverse cross sectional view of an essential part.
Figure 8:
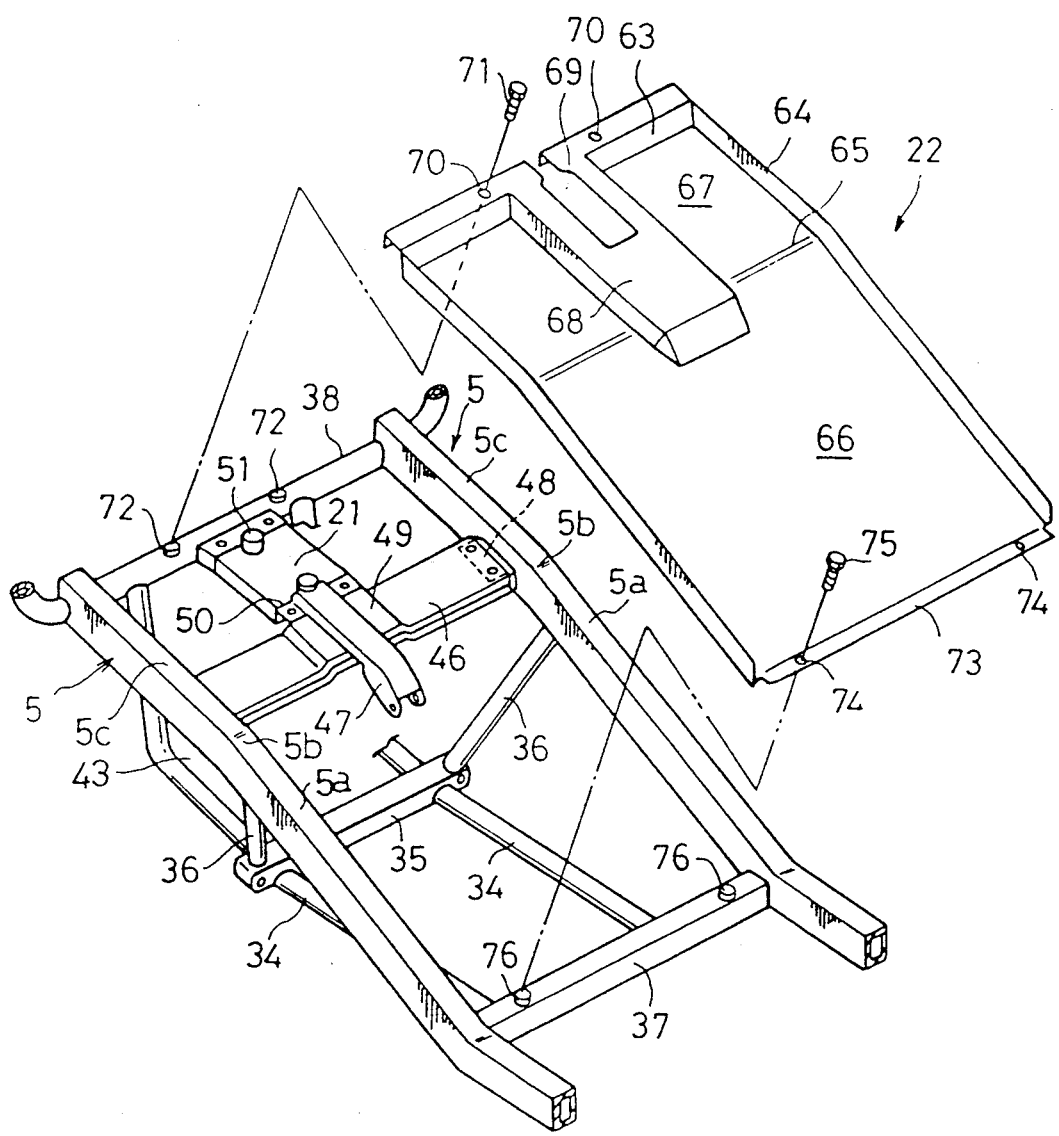
FIG. 8 is an exploded perspective view showing a mounting state of a step-floor.
Figure 9:
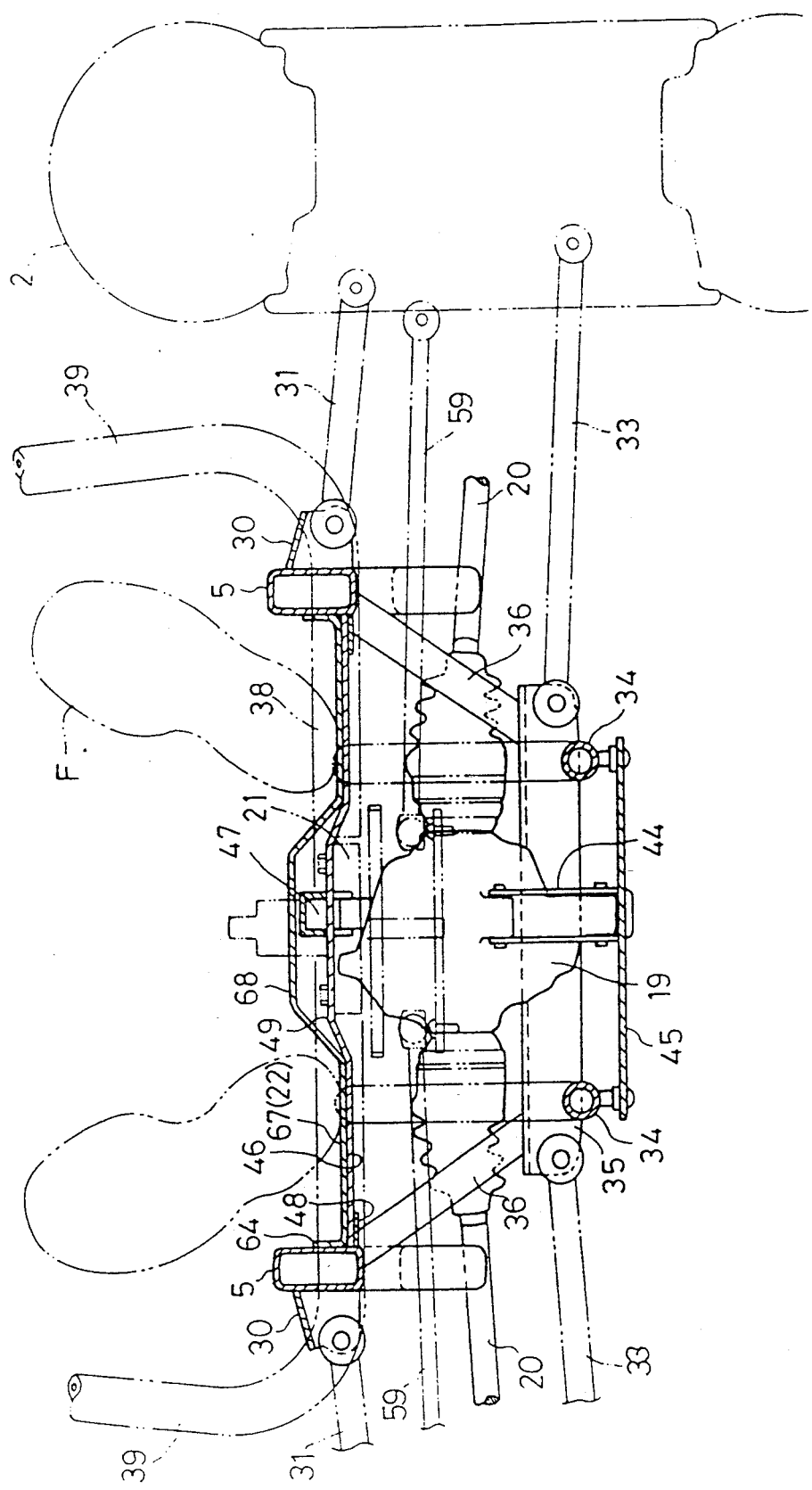
FIG. 9 is a transverse cross sectional view showing a relationship between the step-floor and a front wheel differential case.
Figure 10:
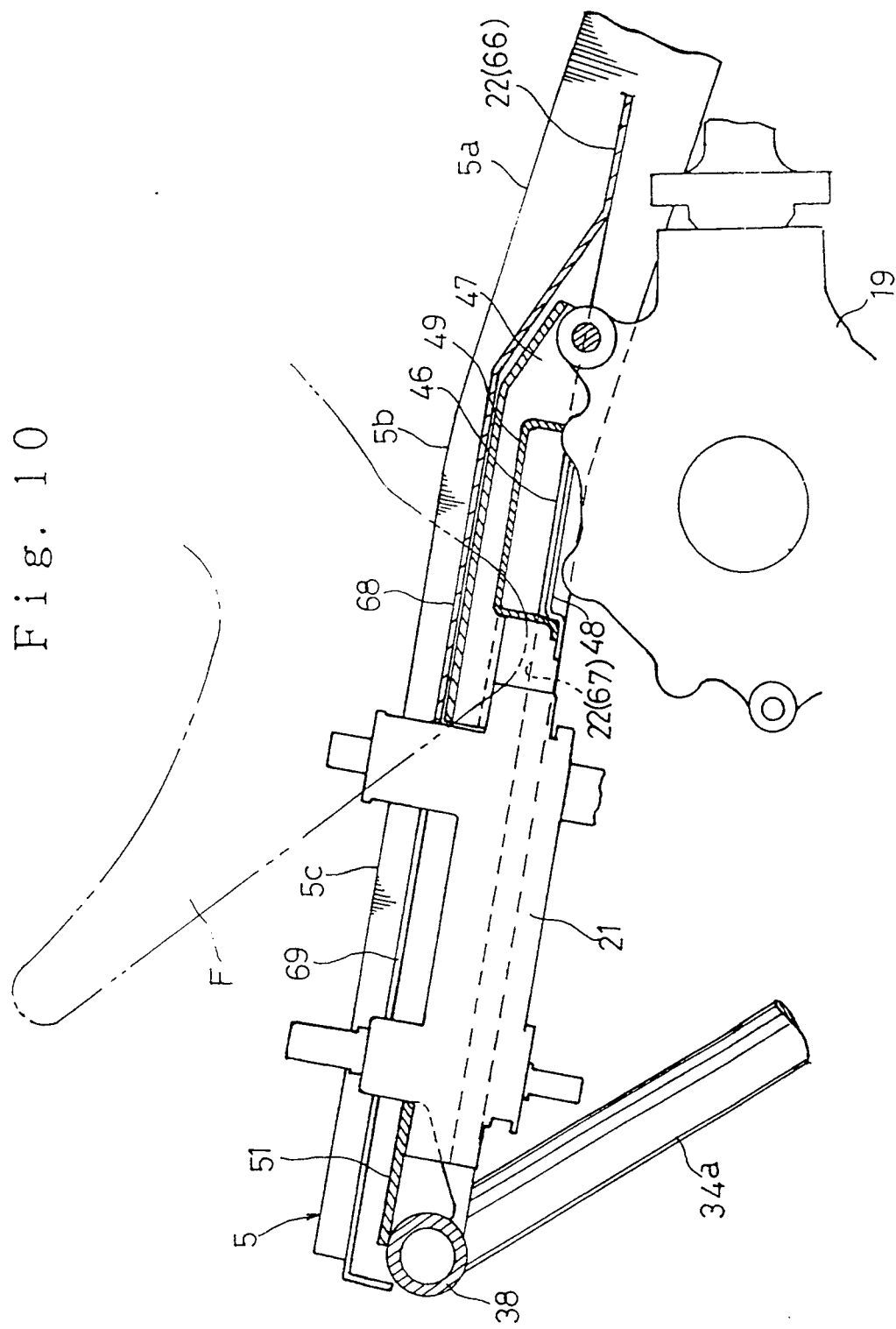
FIG. 10 is a longitudinally fragmentary cross sectional view showing a relationship between the step-floor, the front differential case and a steering gearbox.

The details of the step floor 22 and its mounting construction will next be explained with reference to FIGS. 8 through 11, As shown in FIG. 8, the step floor 22 is surrounded at the front end and the lateral sides thereof with standing walls 63 and 64. The stop floor 22 is provided with an intermediate bent portion 65 which is formed corresponding to the bent portions 5b and 5b of the forward frame sections 5 and 5. The bottom of the step floor 22 is constituted with a rear floor 66 and a front floor 67 with respect to the intermediate bent portion 65. The rear floor 66 spreads over along the rear portions 5a and 5a of the forward frame sections 5 and 5, and the front floor 67 spreads over along the front portions 5c and 5c thereof. The rear floor 66 is used mainly as a step for getting on and off the vehicle like FIG. 11, and the front floor 67 is used mainly as a foot-rest for having the rider's feet rest on it during travelling operation of the vehicle, like FIG. 10. An upwardly projected bead 68 is formed at the middle of the front floor 67 to extend in the forward and backward direction. The forward portion of the bead 68 is provided with a hole 69 for passing the steering shaft 54 and others therethrough. The standing wall 63 is formed with a downwardly opened groove for accommodating the cross pipe 38 therein, wherein screws 71 and 71 (one of the screws being shown) inserted into screw holes 70 and 70 on the top of the wall 63 are threaded into nuts 72 and 72 provided on the front cross pipe 38. The rear end 73 of the rear floor 66 is fixedly secured on the cross member 37 in such a way that screws 75 and 75 (one of the screws being shown) inserted into screw holes 74 and 74 of the rear end 73 are threaded into nuts 76 and 76 of the cross member 37. In such a mounting state as above, as shown in FIG. 9, the front floor 67 of the step floor 22 is positioned lower than the upper surfaces of the forward frame sections 5 and 5 of the main frames 1 and 1. The standing wall 64 is attached to the inner lateral walls of the forward frame sections 5 and 5 so that the front floor 67 is at a lower level than the upper surfaces of the forward frame sections 5 and 5 and the top of the bead 68. The bead 68 is projected upwardly to substantially tile same level as the upper surfaces of the forward frame sections 5 and 5. In the bead 68 there is arranged the upward protrusion 49 of the cross member 46 into which the upper portion of the front wheel differential device 19 is partially accommodated. The front wheel differential device 19 is arranged to be flush at the upper surface thereof with the lower surface of the upper cross member 46 whereby a rate of protrusion at the portion 49 of the upper cross member 46 may be defined to the small extent. Accordingly, as apparent from FIGS. 7 and 9, the bead 68 is formed to be comparatively small and the floor 67 is formed as a whole to be flat so that an enough space may be formed above the floor 67 at each side of the bead 68 thereby permitting an easy access by the rider's feet for operation to a brake pedal $P_B$ and an acceleration pedal $P_A$. As shown in FIG. 10, the rear floor 66 is also positioned below the upper surfaces of the forward frame sections 5 and 5. The bead 68 extends above the steering gearbox 21 so as to accommodate therein the flat upper portion of the steering gearbox 21. The front floor 67 is carried at the lower surface thereof on the cross member 46.

Figure 11:
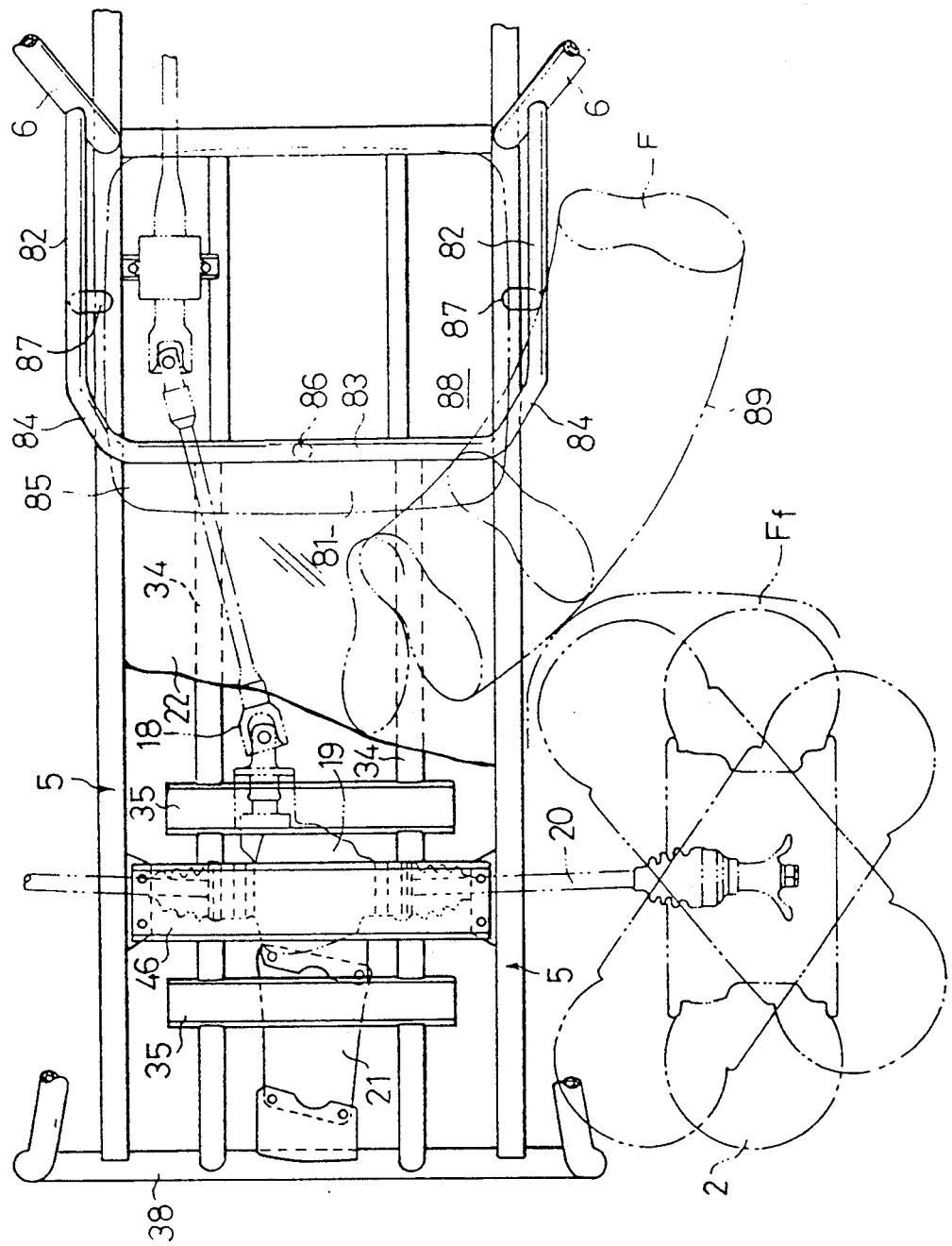
FIG. 11 is a fragmentary top plan view showing a positional relationship between a movement of a rider's foot and a seat.

Next, the relationship between the seat S and the step floor 22 will be explained with reference to FIGS. 4, 5 and 11. The seat S is formed with a back 80 and a cushion 81 like a chair. The cushion 81 is carried on a seat frame 82 to be forwardly and backwardly slidable through a pair of slide rails (not shown) and to be forwardly pivotable like FIG. 1. As shown in FIG. 11, the seat frame 82 is formed generally in a U-shape to extend forwardly of the rear roll bar 6 and connected at each rear end thereof with the right and left sides of the roll bar 6. A front section 83 of the seat frame 82 transversely extends above and between the right and left main frames 1 and 1 and each side section of the seat frame 82 extends in parallel with the right and left main frames 1 and 1. These front section 83 and side sections of the seat frame 82 are connected to each other by round corners 84, and hence the cushion 81 is formed round at each side of a front portion 85 thereof corresponding to the round corners 84. The seat frame 82 is provided at the middle of the front section 83 with a front upright leg 86 and at each middle of the side sections with side upright legs 87 and 87. The front leg 86 is fixedly secured at its lower end to the cross member 37. Similarly, the side upright legs 87 and 87 are fixedly secured at these lower ends to the right and left main frames 1 and 1, respectively. As seen in FIG. 4, under the right and left front corners 84 of the seat frame 82 there are arranged no component parts such as the front leg 86, the side legs 87 and 87 or the like so as to form an open space 88. FIG. 11 illustrates the relationship between the seat 82 and motions of the rider's feet S. As viewed from above, the rider's foot F passes through the inside under the front corners 84 as depicted by a trajectory line 89 when getting off the vehicle. The cushion 81 is disposed close to the front fenders Ff and Ff.

Figure 12:
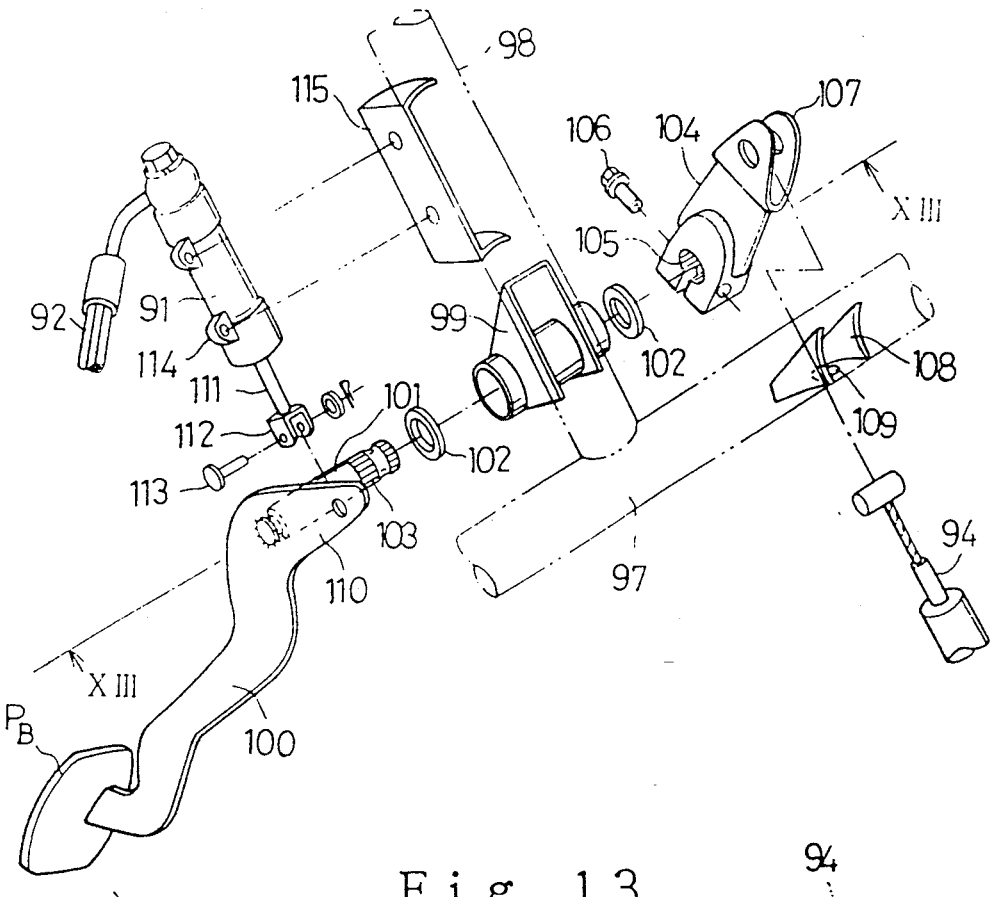
FIG. 12 is an exploded perspective view showing a mounting state of a brake pedal.
Figure 13:
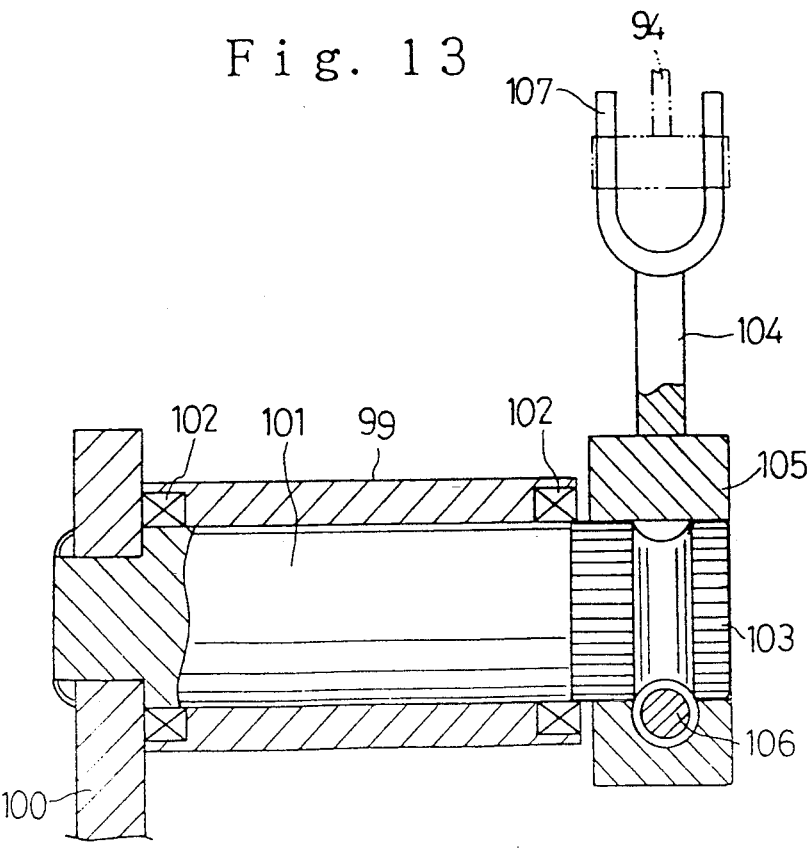
FIG. 13 is a cross sectional view taken along line XIII—XIII of FIG. 12.

The brake apparatus will next be explained with reference to FIGS. 2, 5, 7, 12 and 13. As shown in FIG. 2, within wheel hubs of the front wheels 2 and 2 there are provided front drum brakes 90 and 90 to be operated with oil pressure which is connected through an oil pressure hose 92 to a master cylinder 91 mounted on the front of the vehicle. On the other hand, the rear brake 29 is a mechanical operation type and is actuated in such a way that a cam shaft 93 is operated by either one of dual controllable brake wires 94 and 95 which are pulled at the time of braking. The brake wire 94 is connected with the brake pedal $P_B$ to be operable simultaneously with the front brake 90, while the brake wire 95 is operably connected with a side brake lever $L_{SB}$. As seen in FIG. 7, the brake pedal $P_B$ is mounted on a vertical center pipe 98 which connects between an upper and a lower cross members 96 and 97 extending between the right and left upright portions 39. The brake pedal $P_B$ is operably connected to the master cylinder 91 and the brake wire 94. FIG. 12 illustrates a front view of the mounting condition of the brake pedal $P_B$ in an exploded fashion wherein the brake pedal $P_B$ is pivotably mounted through its sidewardly projected pivot shaft 101 at the top end thereof on a pivot bracket 99 of the center pipe 98. A serrated portion 103 of the pivot shaft 101 is engaged with a serrated portion 105 provided on an end of a link arm 104 so as to be fastened by a bolt 106. Reference numerals 102 and 102 designate a dust seal to be arranged at each side of the pivot shaft 101. A bifurcated portion 107 formed at the other end of the link arm 104 is engaged with an end of the brake wire 94. The brake wire 94 extends downwardly through a hole 109 of a pair of guide brackets 108 provided on the cross member 97 beneath the link arm 104 thereby to enter under the step floor 22 at a portion close to the gear shaft 53 as shown in FIG. 7. The brake wire 94, like FIG. 2, extends rearwardly along the main frames 1 and 1 so as to be connected at the rear end thereof with the cam shaft 93 of the rear brake 29. In FIG. 12, a pedal arm 100 is formed on the upper end thereof with a projected portion 110 which extends forwardly of the pivot shaft 101. A joint end 112 of a piston rod 111 of the master cylinder 91 is connected through a joint pin 113 with the projected portion 110 in such a manner that the piston rod 111 is telescopically movable along the master cylinder 91 through the pivotal movement about the pivot shaft 101 of the brake pedal $P_B$. The master cylinder 91 is mounted at bosses 114 thereof on a bracket 115 of the center pipe 98. The oil hose 92 is connected at one end thereof to an end of the master cylinder 91 and at the other end thereof to the pair of right and left front brakes 90 as seen in FIG. 2. FIG. 13 is an enlarged cross section taken along the pivot shaft 101 illustrating the mounting condition of the brake pedal $P_B$ on the pivot bracket 99, wherein when the brake pedal $P_B$ is rotated along with the pivot shaft 101, the link arm 104 is rotated simultaneously with the brake pedal $P_B$.

The operation and effect of this embodiment will be explained hereunder. As shown in FIGS. 1 and 2, since the comparatively large main frames 1 and 1 are arranged close to the rear wheels 4 and 4 as well as the front wheels 2 and 2, the vehicle body may be constructed with high strength. Such large main frames are manufactured by a two-dimentional bending process whereby the same may be formed low in cost and high in precision. The main frames 1 and 1 define the lowermost height from ground rearwardly of the seat S, thereby contributing to the easy riding and the low center of gravity of the vehicle. The crank shaft 12a of the engine 12 extends parallel with the longitudinal axis of the vehicle so that mass concentration around the center of the vehicle may be achieved and the length of the vehicle may be diminished whereby the vehicle will become compact in construction to enhance driveability. Further, the power transmission through the front and rear propeller shafts 18 and 23 will be easily effected. There are arranged within an accommodating space 43 tile front propeller shaft 18, the front wheel differential device 19, the front wheel axle 20 and the steering gearbox 21 to be surrounded with the right and left forward frame sections 5 and 5 and the sub-frames 34 and 34 and to be positioned higher than the lowermost level of the sub-frames 34 and 34. Accordingly, these members will not be susceptible to hitting ground and this is enhanced by the under cover 44 and the skid plate 45. The mounting operation of the skid plate 45 hence may be easily effected. When dismounting the step floor 22, access to these members from above will be easily ensured. The step floor 22 is inclined downwardly from the front floor 67 to the rear floor 66 whereby the floor 22 in front of the seat S will be at the lowermost level from ground so as to easily get on and off the vehicle.

In FIG. 7, there is formed the inverted equilateral trapezoid by the junctures A and B between each of the forward frame sections 5 and 5 and each of the upper arms 31 and 31 and by the junctures B and C between each of the sub-frames 34 and 34 and each of the lower arms 33 and 33 so that the upper arms 31 and 31 may be shortened without shortening the lower arms 33 and 33, and that a space between the forward frame sections 5 and 5 may be widened without extending a tread between the front wheels 2 and 2. The step floor 22 therefore may be enlarged in its lateral direction thereby enlarging the space around the rider's feet while making the vehicle width compact. The upper arms 31 and 31 are arranged at the sides of step floor 22 so that the step floor 22 may be positioned at a lower level below the upper arms 31 and 31. The lower arms 33 and 33 are mounted close to the central axis of the vehicle and become long enough to make a swing angle small so as to ensure a sufficient suspension stroke.

As apparent from FIGS. 7, 9 and 10, the steering gearbox 21 and the front wheel differential device 19 are made flat at the upper surfaces thereof so that the step floor 22 above these members may be formed flat excepting the bead 68 and a wide space will be spread over above the step floor 22. The upper cross member 46 on which the floor 22 is mounted is formed strong enough to support the weight of the rider from above. Further, since the cross member is used for supporting the front differential device 19 as well, a special cross member for supporting the step floor 22 is not required thereby resulting in a simple and light construction. The steering gearbox 21 is disposed in front of the front wheel differential device 19 and thus the steering shaft 54 projecting upwardly of the step floor 22 may be positioned forwardly as far as possible whereby a large space is obtained around the brake pedal $P_B$ and the acceleration pedal $P_A$ for easy operation.

As apparent from FIG. 11, when the rider gets on and off the vehicle, the rider's foot passes through a limited space between the front fender Ff and the corner 84. Under the corner 84, however, there is formed an open space 88 which permits the rider's foot to pass therethrough like the trajectory 89, so that a smooth movement of the rider's foot may be effected and a space in front of the seat S may be effectively diminished. If the seat S is rotatable on a vertical axis thereof to turn 90 degrees toward the lateral direction thereof, it is possible for the rider to more smoothly get on or off the vehicle.

Figure 14:
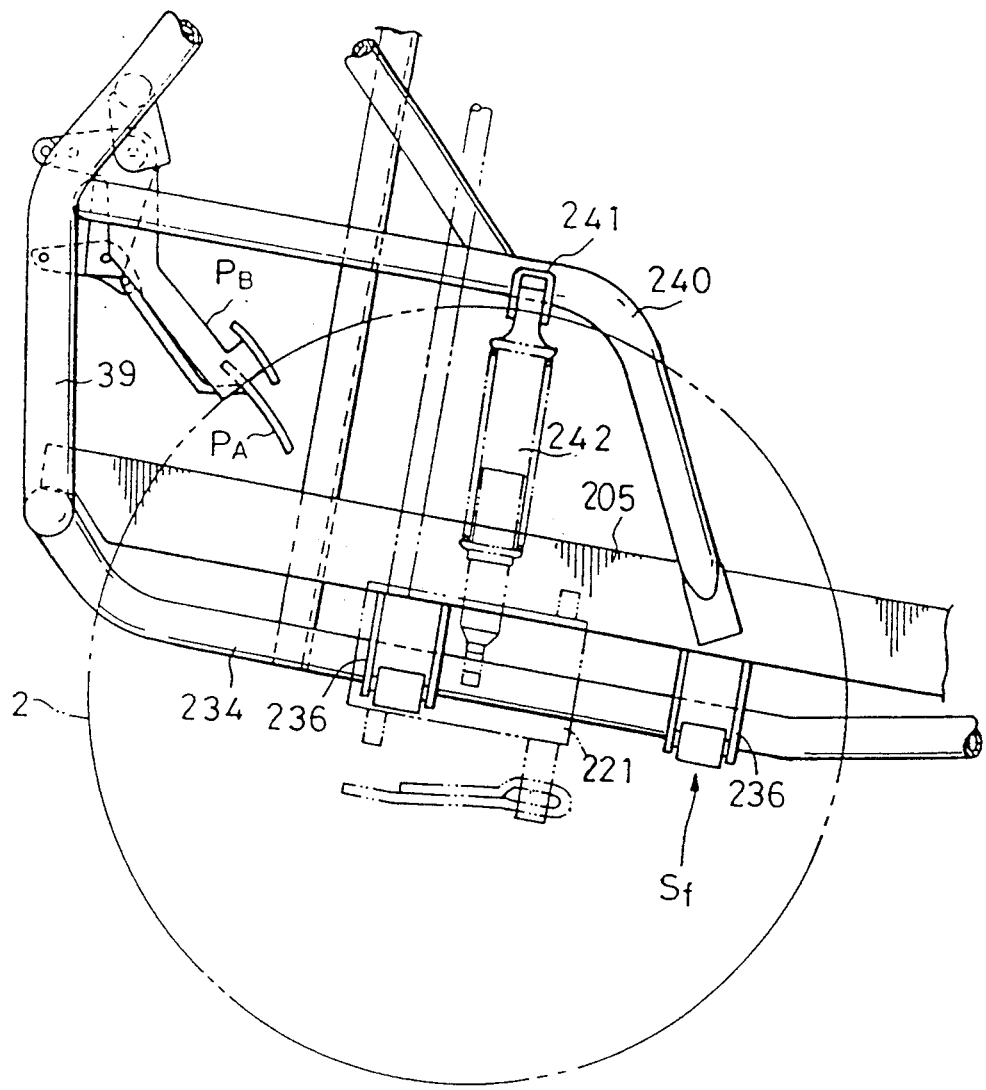
FIG. 14 is a side view of an essential part of a first partial modification showing a front wheel suspension device of a single swing arm type.
Figure 15:
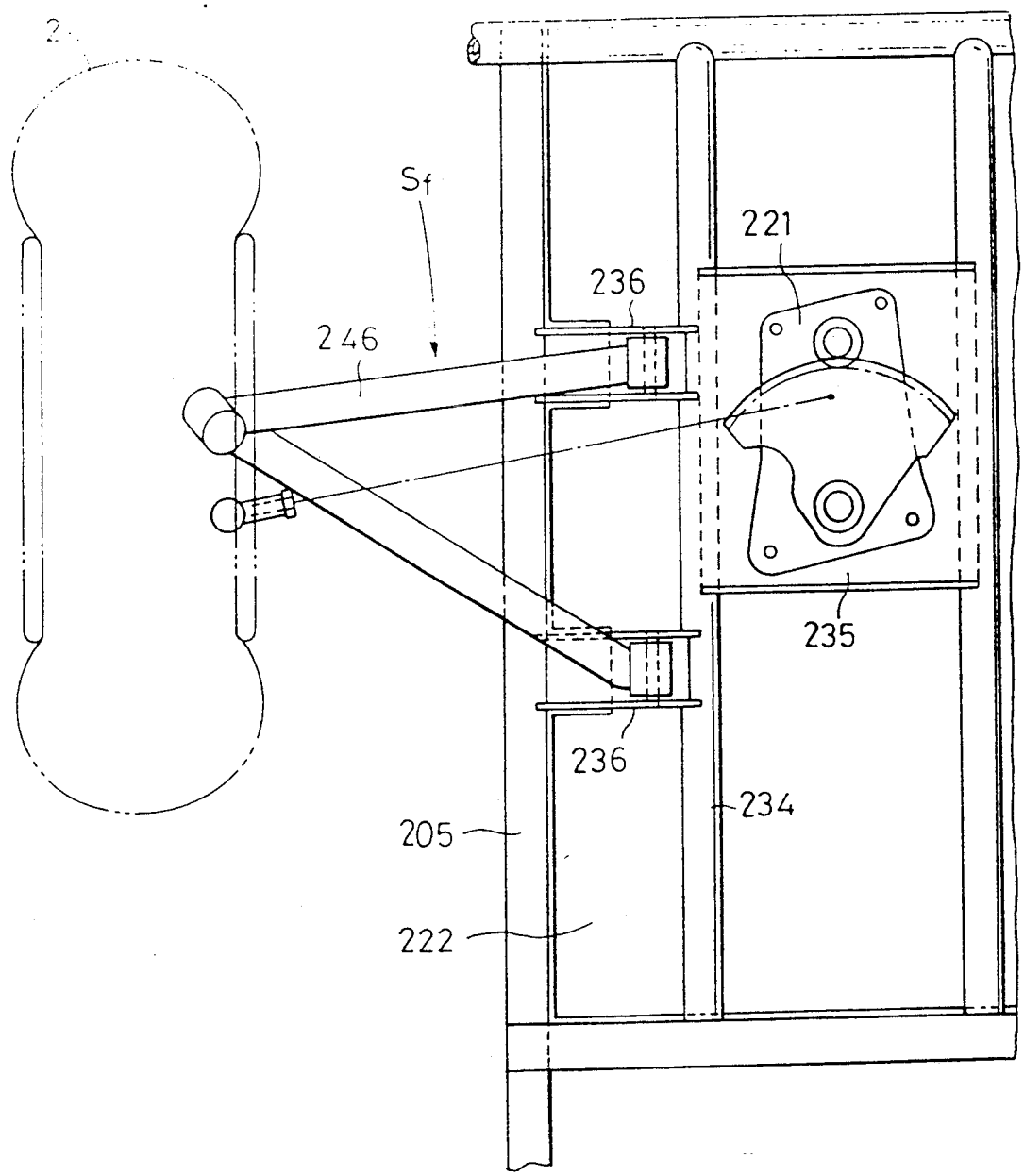
FIG. 15 is a fragmentary bottom view thereof.
Figure 16:
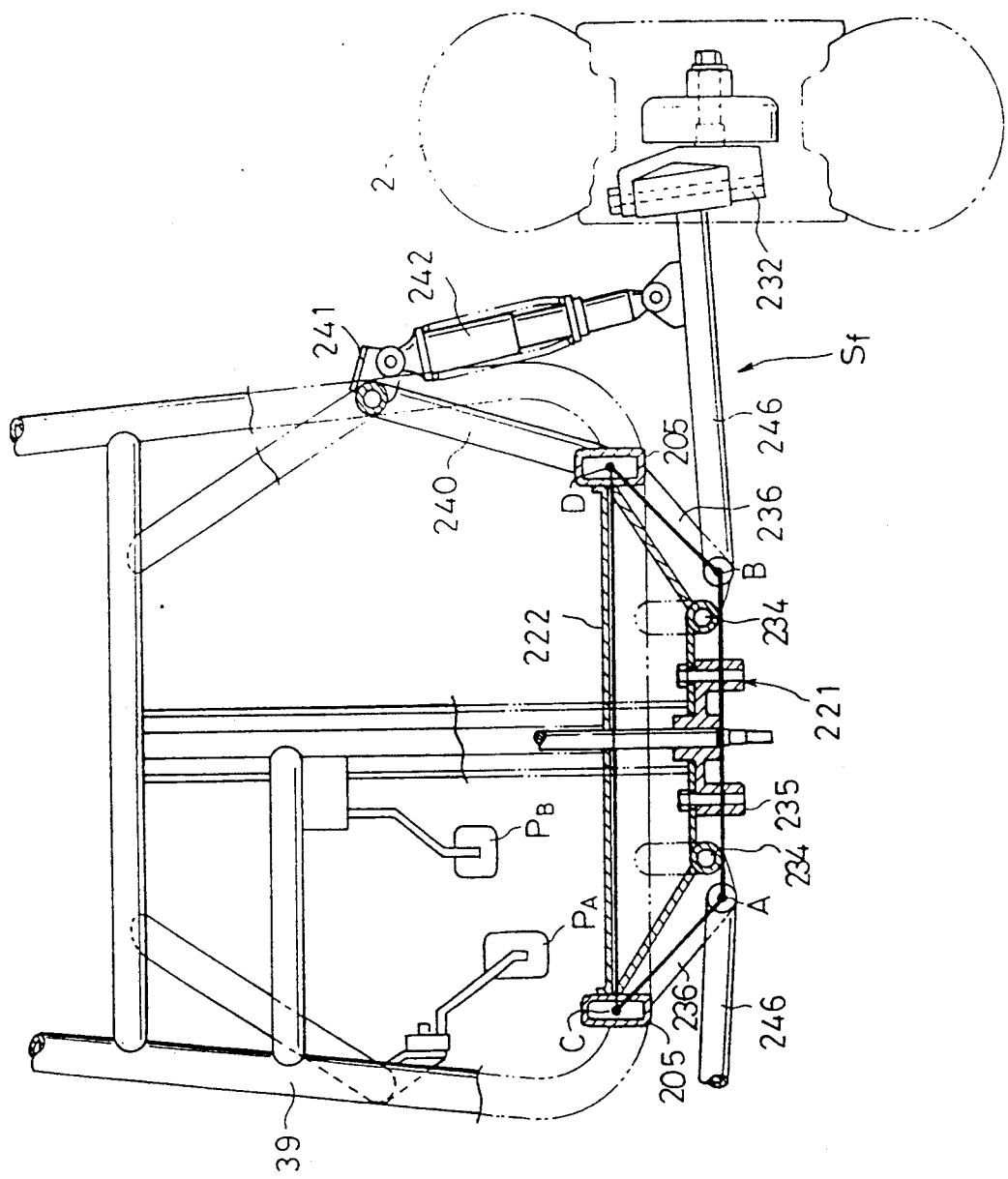
FIG. 16 is a fragmentary front elevational view thereof partly in cross section.

FIGS. 14 through 16 show a front wheel suspension apparatus of a single swing arm type according to a first modification of the present invention. The frame construction is formed substantially similar to the first embodiment. A pair of sub-frames 234 and 234 are provided under and between a pair of forward frame sections 205 and 205 to be in parallel therewith. A cross member 235 extends transversely between the sub-frames 234 and 234. Joint members 236 and 236 extend obliquely to connect the sub-frames 234 and 234 with the forward frame sections 205 and 205. Right and left swing arms 246 and 246 are mounted at the basal ends as junctions A and B thereof on each of the joint members 236 and 236 in the vicinity of the cross member 235. Each of the swing arms 246 and 246 constitutes a suspension arm of the front wheel suspension apparatus and is connected at its free end thereof with a knuckle arm 232 of a front wheel 2 in FIG. 16. A pair of right and left front cushions (shock absorbers) are arranged between each intermediate portion of the swing arms 246 and 246 and each of cushion brackets 241 and 241 provided on L-shaped pipes 240 and 240. A step floor 222 is arranged to extend over between the right and left forward frame sections 205 and 205 substantially in a similar fashion to the first embodiment. As illustrated in FIG. 16, the frame is constituted with an inverted equilateral trapezoid construction by connecting four points A, B, C and D wherein the points A and B are junctions between the swing arms 246 and 246 and the joint members 236 and 236 and the points C and D are positioned on each center of the forward frame sections 205 and 205. Accordingly, similar to the first embodiment, the space between the forward frame sections 205 and 205 is capable of being widened without alteration of a tread between the front wheels 2 and 2 so as to make the step floor 222 wider and lower. The swing arms 246 and 246 are long enough to ensure a sufficient suspension stroke. In this modification, a steering gearbox 221 is supported on the cross member 235.

Figure 17:
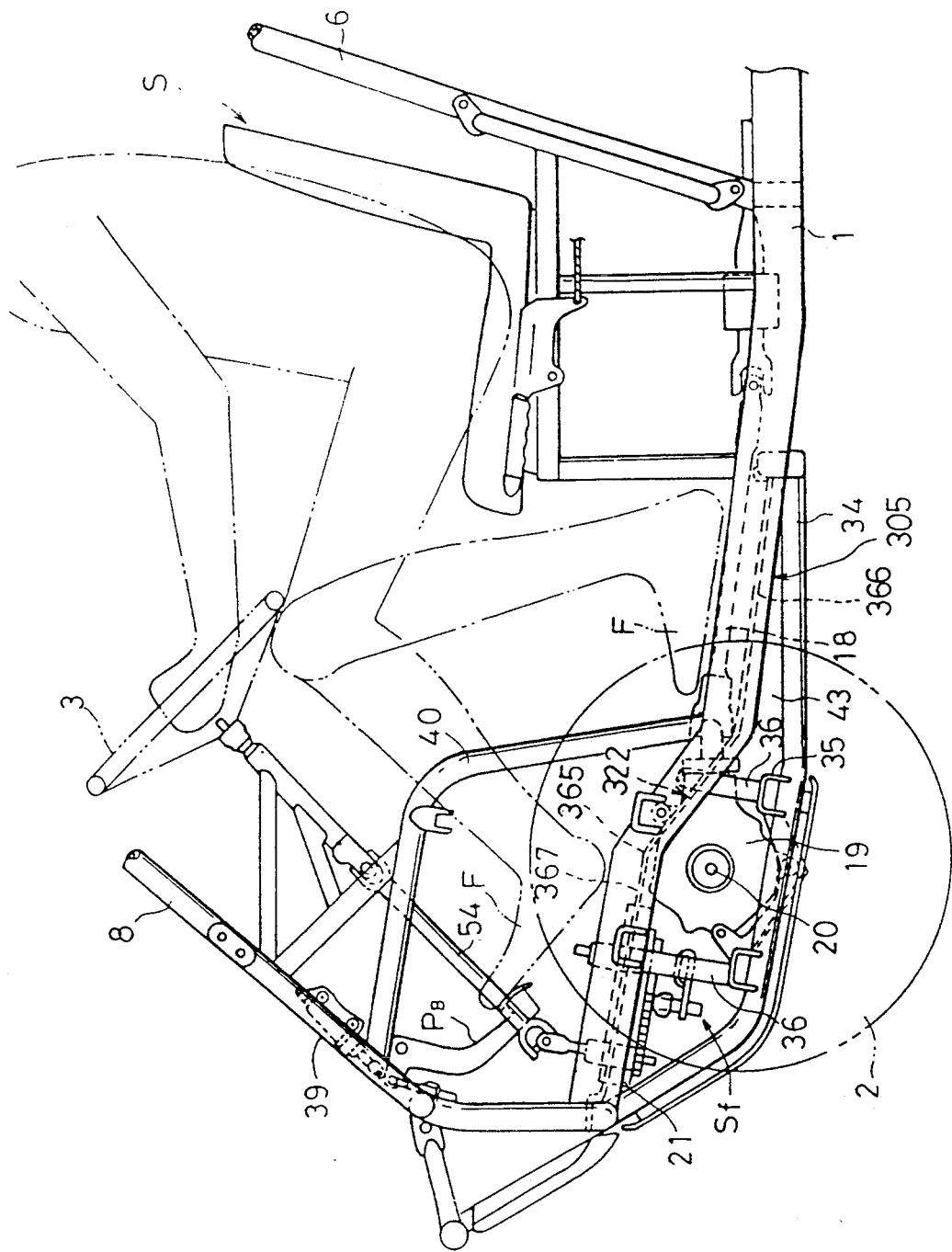
FIG. 17 is a side view of a second partial modification similar to FIG. 5.

FIG. 17 illustrates a second modification in relation to a step floor. The step floor 322 is formed with a first and a second floor 366 and 367 which are inclined forwardly upwardly at the same angle and which are connected by a step 365 with each other. With this construction, the first floor 366 is positioned low enough to improve the characteristics of getting on and off the vehicle. An upper frame 305 has a clearly stepped shape as compared to the first embodiment.

Figure 18:
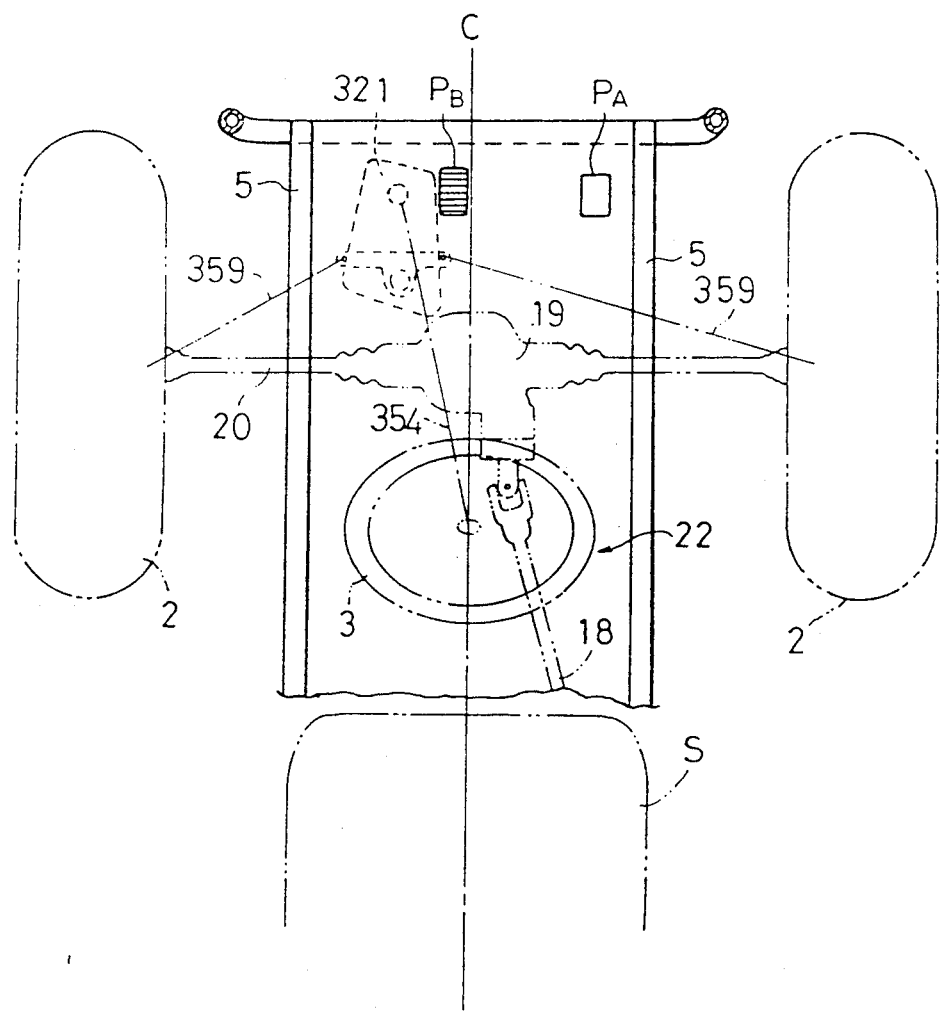
FIG. 18 is a top plan view of a third partial modification showing another arrangement of a steering gearbox.

FIG. 18 shows a third modification in relation to a front wheel steering apparatus in which a steering gearbox 321 is arranged in a leftwardly offset position to a longitudinal central axis C of the vehicle. According to this arrangement, a brake pedal $P_B$ and an acceleration pedal $P_A$ may be located at one side (left side) of a steering shaft 354. A pair of tie rods 359 and 359 are different in length from each other. The front wheel driving apparatus is constituted similar to the first embodiment.

Figure 19:
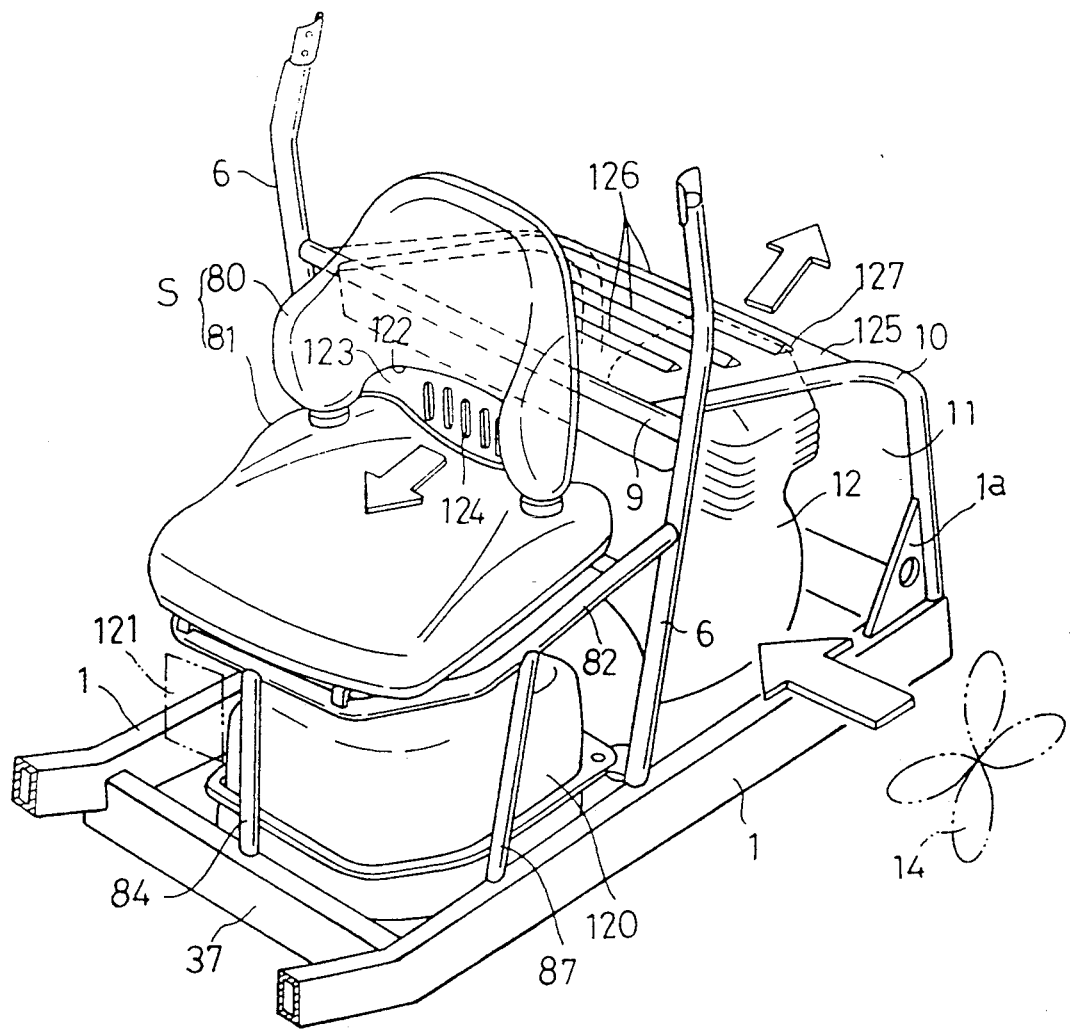
FIG. 19 is a fragmentary perspective view of a fourth partial modification showing a cooling and ventilating construction of an engine room.
Figure 20:
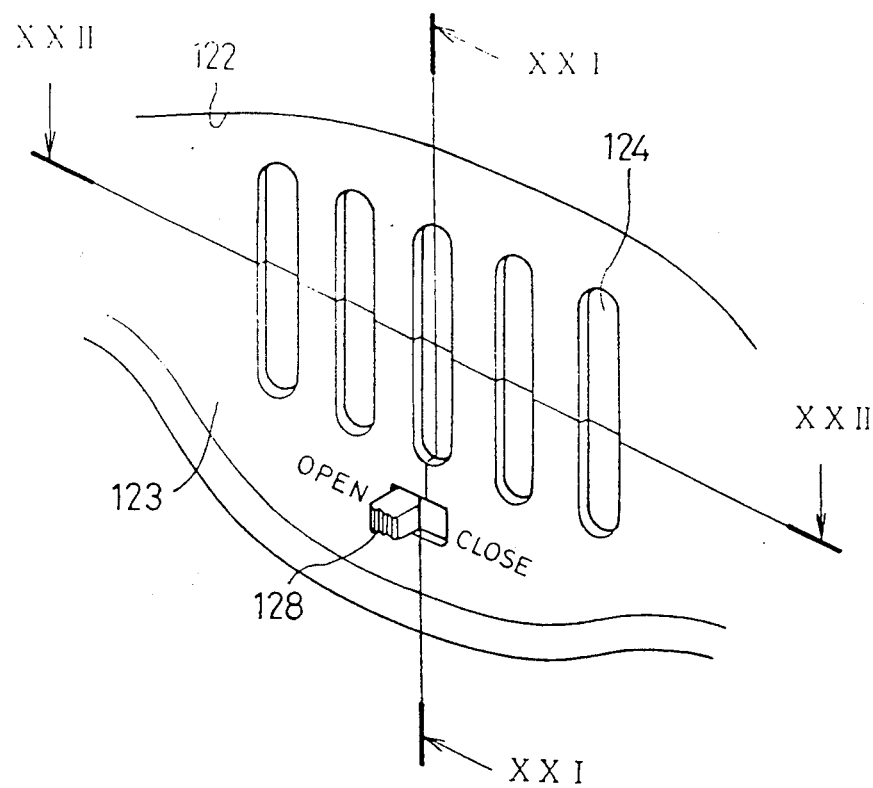
FIG. 20 is a fragmentary perspective view of an essential part thereof.
Figure 21:
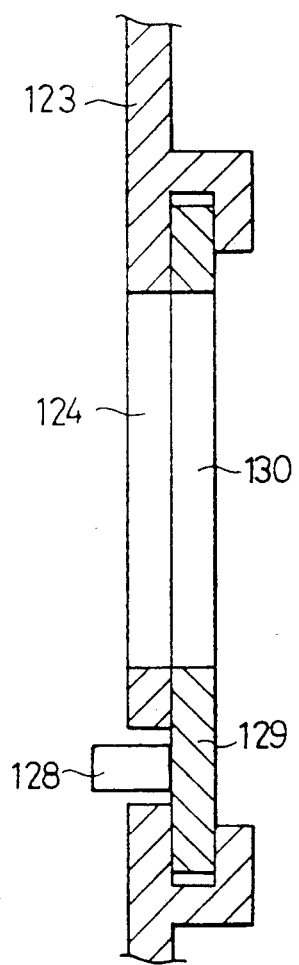
FIG. 21 is a cross sectional view taken along line XXI—XXI of FIG. 20.
Figure 23:
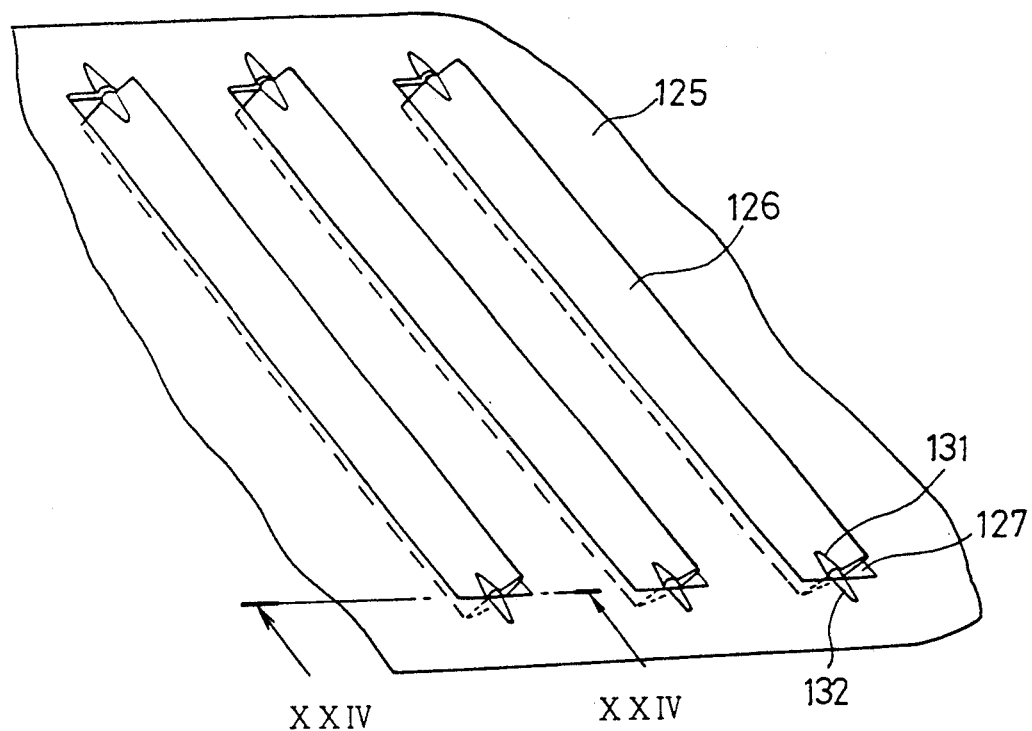
FIG. 23 is a fragmentary perspective view of an essential part thereof.
Figure 24:
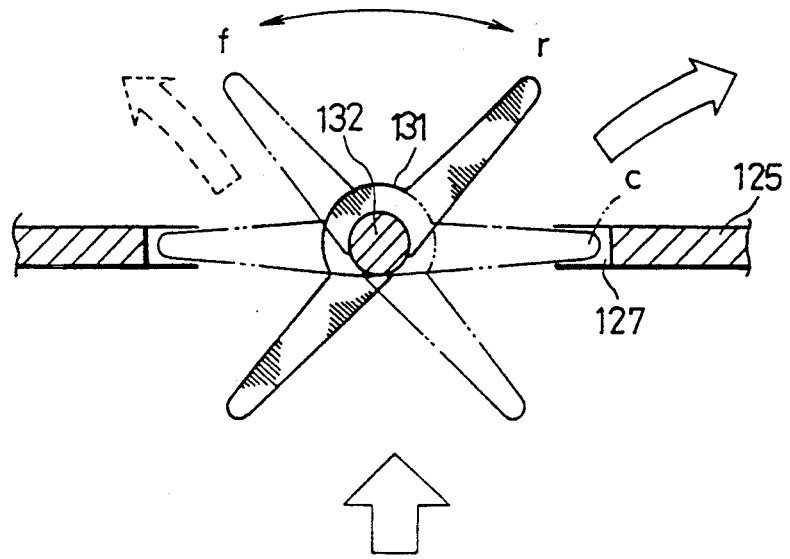
FIG. 24 is a cross sectional view taken along line XXIV—XXIV of FIG. 23.

In FIGS. 19 through 24 there is illustrated an air ventilating construction with respect to an engine room 11 as a fourth modification. In FIG. 19, a seat S is arranged in front of the engine room 11 and a fuel tank 120 is located within an area defined under a cushion 81 of the seat S. At a right portion of the area there is provided a space 121 for accommodating an article therein. The lower part of the space 121 is provided for passing therethrough a front wheel driving apparatus such as a front propeller shaft 18 and the like as referred to in FIGS. 2 and 5. Under a seatback 80 a fixed plate 123 is provided to cover a clearance 122 positioned behind the rider's waist and is formed thereon with air ventilating slots 124. An engine shroud 129 is arranged between a pair of right and left reinforcing pipes 10 and 10 for constituting the engine room 11 at the rear of the seat S to shield an upper area of the engine room 11. A plurality of variable louvers 126 are provided on the upper portion of the engine shroud 125 such that their inclined angles are optionally adjusted in such a manner that a plurality of air exhaust openings 127 may be adjusted to vary the ratios of opening area and the directions of air flow thereof. Accordingly, a hot air flowing through the air exhaust openings 127 from the engine room 11 can be directed toward the rider, depending on the inclination of the variable louvers 126. The engine room 11 is covered at the upper side thereof by the engine shroud 125 and at almost all the front side thereof by the seat S and the fuel tank 120. Thus, there is constituted a heat shielding cover with the engine shroud 125 and seat S. The ventilating slots 124 are controlled to open and close by operation of a knob 128, as seen in FIGS. 20 and 21. At the back surface of the fixed plate 123 a shutter 129 is slidably arranged to be moved rightwards and leftwards by the knob 128 and is provided thereon with a plurality of slots 130 which are formed substantially in the same configuration and at the same intervals as the air ventilating slots 124. As apparent from FIG. 22, the air ventilating slots 124 can be opened and closed by putting the slots 130 of the shutter 129 into and out of register with the ventilating slots 124 in accordance with movement of the shutter 129. FIG. 22(a) shows such an open state that the slots 130 are registered with the air ventilating slots 124 by sliding the shutter 129, and FIG. 22(b) shows such a closed state that the slots 130 are slid in a staggered position not to register with the slots 124. This shutter 129 is shown merely as an example of an opening and closing control means in an air conditioning system. In the open state as shown in FIG. 22(a), hot air within the engine room 11 is admitted from the air ventilating slots 124 so as to be directed toward the rider. FIG. 23 illustrates a portion of tho engine shroud 125 in an enlarged perspective view and FIG. 24 illustrates one of the variable louvers 126 in an enlarged section. The louvers 126 are mounted in a resilient engagement between bosses 131 provided on each end thereof and pivot pins 132 provided on the opposed edges of each air exhaust opening 127. Each louver 126 is rotatable about the pivot pin 132; and it is possible to keep a desired opening position whereby the opening conditions such as a size of the opening and a direction of the air flow are adjustably controlled in such a way that in a rearwardly inclined position "r" of each variable louver 126 the heated air within the engine room 11 flows rearwards out of the openings 127 while in an inverted forwardly inclined position "f" thereof it flows forwards in the direction of the rider in the front side of the seat S. When the louvers 126 are in a horizontal position "c", the air exhaust openings 127 are closed to stop the air flow therethrough. This construction of the variable louvers 126 is an example of changeable opening and closing means in an air conditioning system.

In FIG. 19, when the cooling fan 14 is operated, cooling air is forced to be introduced into around the engine 12 thereby cooling the engine 12. As the cooling fan 14 facing sideways is arranged projectingly at the lateral side of the vehicle, a sufficient amount of the air is introduced into the engine room 11 irrespective of the rearward arrangement of the cooling fan 14 with respect to the seat S. When required to cool the engine 12, the variable louvers 126 are operated to direct rearwards in the open position of "r" so that the heated air within the engine room 11 is effectively discharged in a rearward atmosphere. At that time, the air ventilating slots 124 close to the seat S are closed with the shutters 129 so as to shut off a forward compartment of the seat S from the engine room 11. On the other hand, when required to warm the forward compartment, the shutters 129 are operated to open the air ventilating slots 124 so as to communicate between the engine room 11 and the forward compartment. At that time, the variable louvers 126 are actuated to the forwardly inclined position "f" or to the closed position "c" thereof. In the forwardly inclined position "f", the hot air flows out of the air exhaust openings 127 of the engine shroud 125 to be directed mainly to upper atmosphere of the rider whereby air conditioning will be performed in a comparatively wide range. In the closed position "c", the hot air does not flow out of the openings 127 but is directed to the air ventilating slots 124 to thereby facilitate air conditioning in a comparatively narrow space. Similarly, when closing the air ventilating slots 124 in the forwardly inclined position of the variable louvers 126, a comparatively weak air conditioning will be effected in a wider range. As explained hereinabove, the air conditioning will selectively take place depending on the circumstances. When the air ventilating slots 124 are in the closed state and the louvers 126 are in the rearwardly inclined position, the air conditioning will not take place but tile engine 12 will be effectively cooled. Instead of the variable louvers 126, the louvers may be formed integral with the engine shroud 125 or may be constituted in a detachable unit with fixed slant louvers thereon. In the latter case, if the unit is mounted by turning 180 degrees, openings may be reveresed in direction. The cooling fan 14 is disposed facing sideways to hence ensure a smoother air flow toward either the forward or backward direction in comparison with a forwardly facing cooling fan. The cooling fan 14 is in series arranged with the radiator 14 so as to effectively facilitate a cooling of the radiator 14, even if a ram air is not expected.

Figure 25:
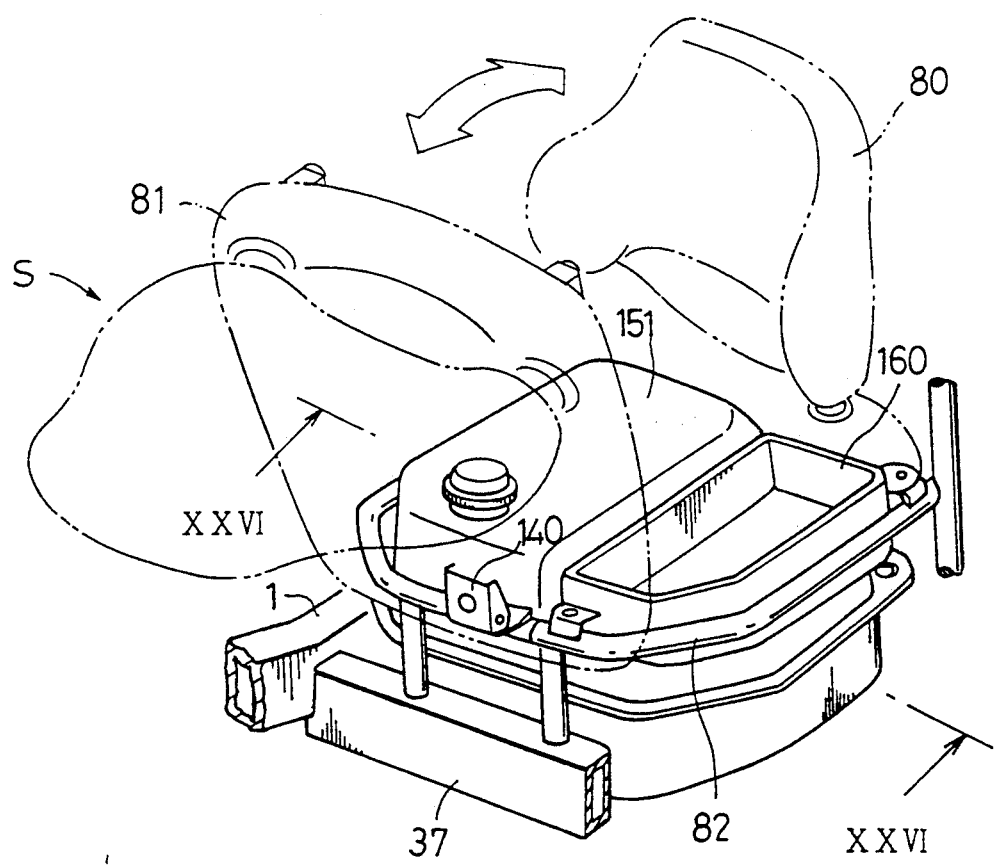
FIG. 25 is a fragmentary perspective view of a fifth partial modification showing a construction under a seat.
Figure 26:
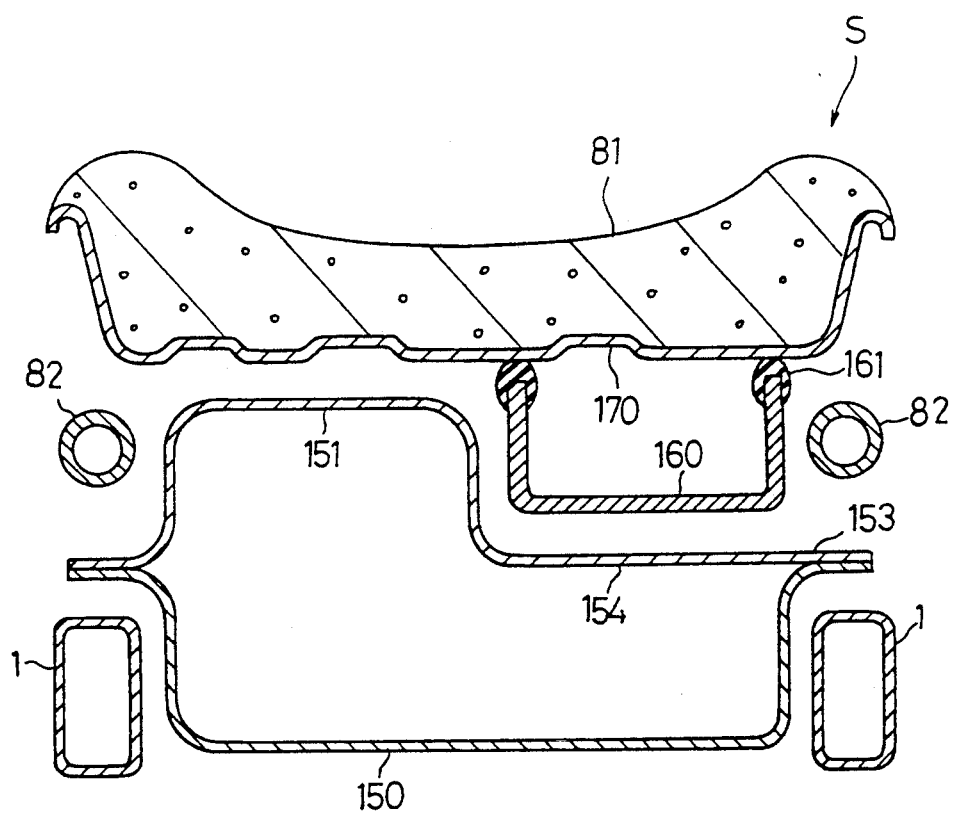
FIG. 26 is a cross sectional view taken along line XXVI—XXVI of FIG. 25.

FIGS. 25 and 26 illustrate a construction under a seat S as a fifth modification. A cushion 81 of the seat S is pivotably mounted through a hinge 140 on the front of a seat frame 82 and forwardly pivotable together with a back 80 of the seat S. Under the seat S there are disposed a fuel tank 150 and an article housing box 160. The fuel tank 150, as seen in FIG. 26, is arranged at an upper portion 151 thereof within a space defined by the seat frame 82 and at the lower portion 152 thereof between each of right and left main frames 1 and 1 and each of right and left cross members 37 and 37 so as to be supported on the main frames 1 and 1. On the periphery of the fuel tank 150 a flange 153 is provided to be engaged with the main frames 1 and 1. The upper portion 151 is formed in a stepped configuration and a lower flat step 154 at the right half thereof is formed substantially on the same horizontal plane as the flange 153. The article housing box 154 is disposed on the lower step 154 and carried at the peripheral edges thereof on the seat frame 82. The box 154 has an open top on the peripheral edge of which an edge rubber 161 is arranged to come into a close contact with a bottom plate 170 of the cushion 81. When the seat S is pivotally rotated forwardly, the upper portion 151 of the fuel tank 150 is exposed and the article housing box 160 is opened so as to enable the tank 150 to be filled with fuel and an article to be taken in and out of the box 160. In the above explained manner, the space under the seat S is effectively utilized.

Figure 27:
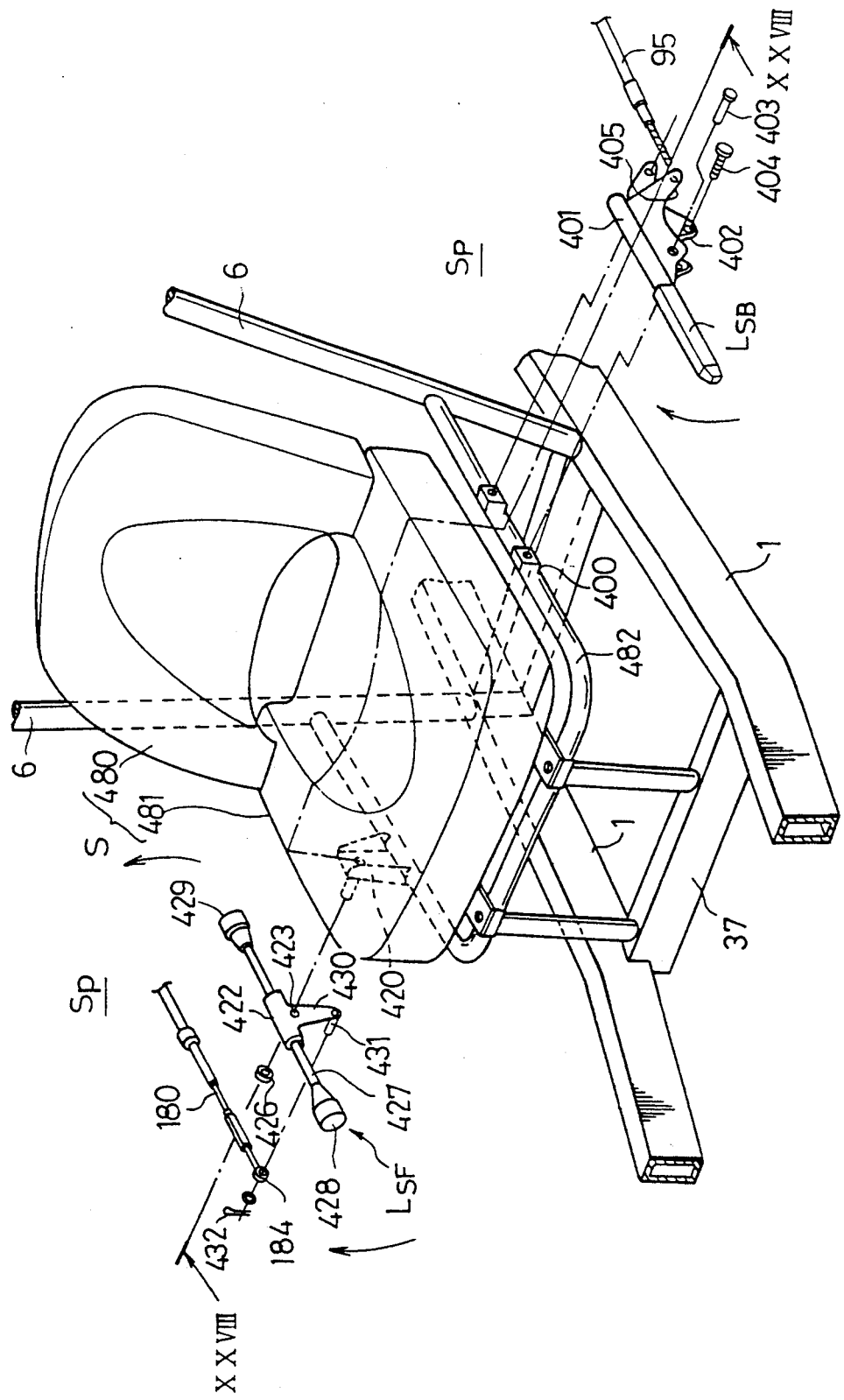
FIG. 27 is an exploded perspective view of a sixth partial modification showing a detail of an operation lever.
Figure 28:
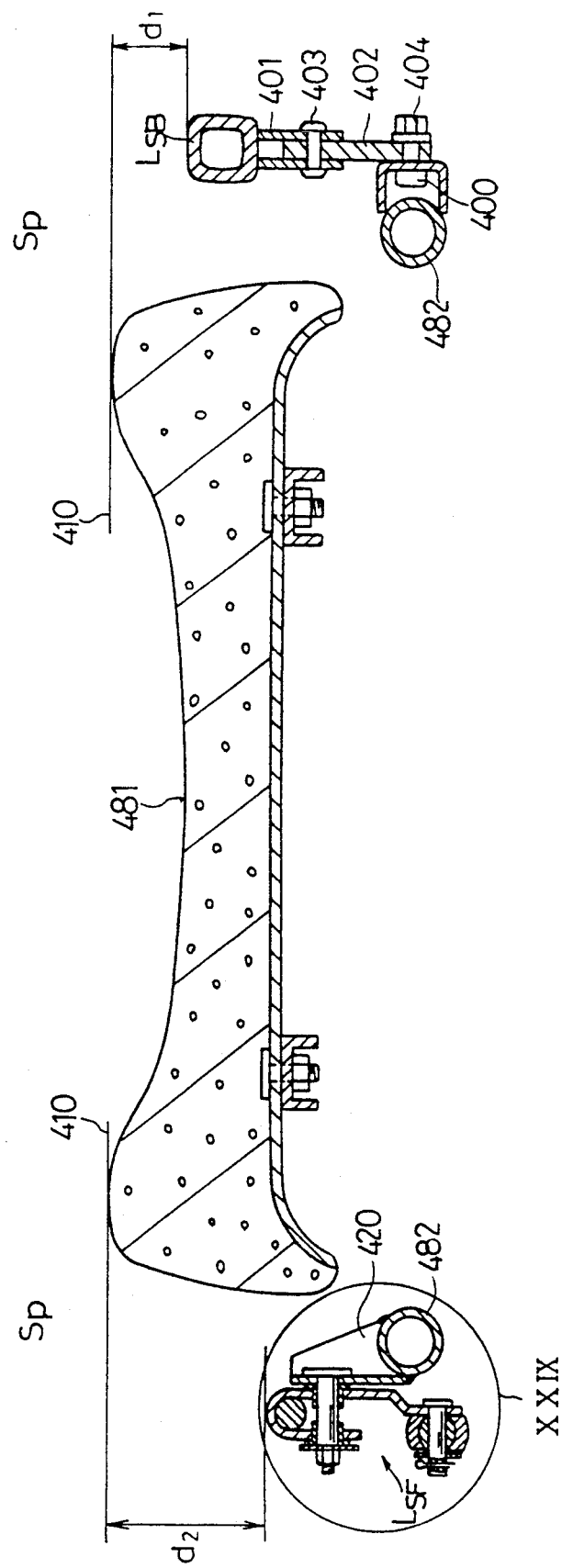
FIG. 28 is a cross sectional view taken along line XXVIII—XXVIII of FIG. 27.
Figure 29:
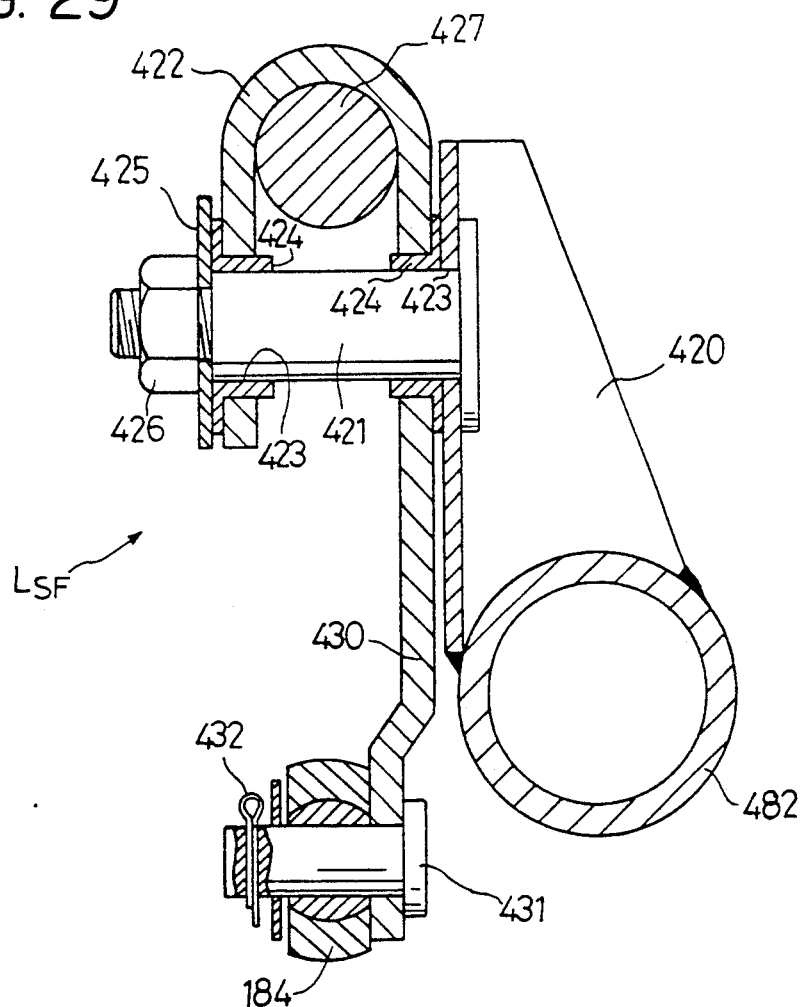
FIG. 29 is an enlarged cross sectional view taken along line XXIX—XXIX of FIG. 28.

The construction and the arrangement of an operation lever will next be explained as a sixth modification with reference to FIGS. 2, 3 and 27 through 29. As illustrated in FIGS. 27 and 28, there are provided open spaces Sp at right and left sides of the seat S. A shift lever $L_{SF}$ and a side brake lever $L_{SB}$ are mounted at each side of the seat S within the open spaces Sp. As apparent from FIG. 27, the shift lever $L_{SF}$ is arranged at the right side of a cushion 481 of the seat S and a shift cable 180 is connected at the front end thereof with the shift lever $L_{SF}$. The other end of the shift cable 180, as shown in FIGS. 2 and 3, extends to a back side of the engine 12 and is connected through a guide bracket 181 mounted on the engine 12 to a shift arm 183 projected outwardly of a transmission 182. When drawing a knob (explained later) of the shift lever $L_{SF}$ upwards, the shift arm 183 is rotated through the shift cable 180 to shift a speed change gear of the transmission 182. A mount 400 for the side brake lever $L_{SB}$ is provided on the left side of a seat frame 482. As shown in FIG. 28, the brake lever $L_{SF}$ is rotatably connected at a bifurcated mounting portion 401 thereof through a pivot pin 403 to a fixing plate 402 which is fixedly secured by a bolt 404 to the mount 400 of the seat frame 482. As seen in FIG. 27, the bifurcated mounting portion 401 is formed with a pair of downwardly extended arms 405 to which one end of the brake cable 95 is connected. As seen in FIG. 28, the side brake lever $L_{SB}$ extends horizontally in a normal inoperative position thereof and is positioned lower by the amount of $d_1$ than a horizontal plane passing an uppermost point of a cushion 481. As illustrated in FIG. 27, the side brake lever $L_{SB}$ is drawn up in a direction like an arrow to rotate upwards around the pivot pin 403 so that the brake cable 95 is pulled to hence operate the rear brake 29. In FIGS. 27 through 29, at the right side of the seat frame 482 there is welded and projected upwardly a shift lever bracket 420 on the upper end of which a pivot shaft 421 is projected horizontally outwardly to mount thereon a T-shaped mounting portion 422 of the shift lever $L_{SF}$. In FIG. 29, the mounting portion 422 is formed with a through bore 423 on which a bush 424 is engaged. The pivot shaft 421 is inserted through the intermediary of the bush 424 into the through bore 423 and fastened at the outer end thereof through a washer 425 by a nut 426. An operation rod 427 which extends along the lateral side of a cushion 481 in a forward and backward direction is connected at the middle thereof with the upper portion of the mounting portion 422 and provided at each front and rear end thereof with operation knobs 428 and 429. The lower portion of the mounting portion 422 is formed with a downwardly extending arm 430 on the lower end of which is fixedly mounted a horizontally outwardly projecting joint pin 431. The shift cable 180 is connected through a joint 84 provided at tile front distal end thereof with a joint pin 431 and fixed thereat by a clip 432. The shift lever $L_{SF}$ is arranged at a lower level by the amount of $d_2$ than a horizontal plane 410 passing the uppermost surface of the cushion 481 in its normal inoperative position as seen in FIG. 28. When operating either one of the operation knobs 428 and 429 upwards like an arrow direction in FIG. 27, tile arm 430 is rotated upwards about the pivot shaft 421 so the to effect the gear shift operation through the shift cable 180. As explained above, since the shift lever $L_{SF}$ and the side brake lever $L_{SB}$ are positioned lower than the uppermost surface 410 of the seat cushion 481 at each close side of the seat S, the rider can get on and off the vehicle without contacting these levers $L_{SF}$ and $L_{SB}$.

Figure 30:
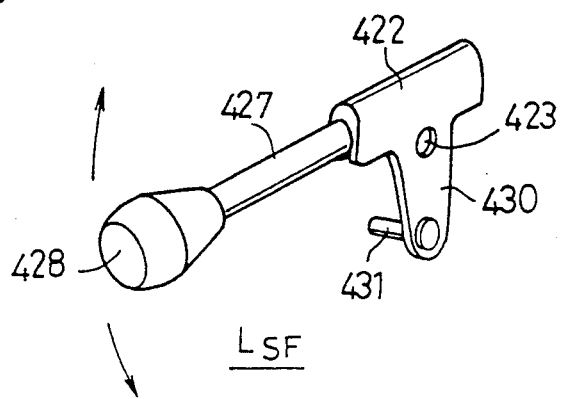
FIG. 30 is a perspective view of a seventh partial modification showing a shift lever.

FIG. 30 illustrates a modification of the shift lever $L_{SF}$ wherein the rear half of the operation rod 427 and the knob 429 are omitted but the remainders correspond to the example in FIG. 27. The knob 428 in this example is operable upwardly and downwardly from the neutral horizontal position thereof to control the gear shift operation.

Figure 31:
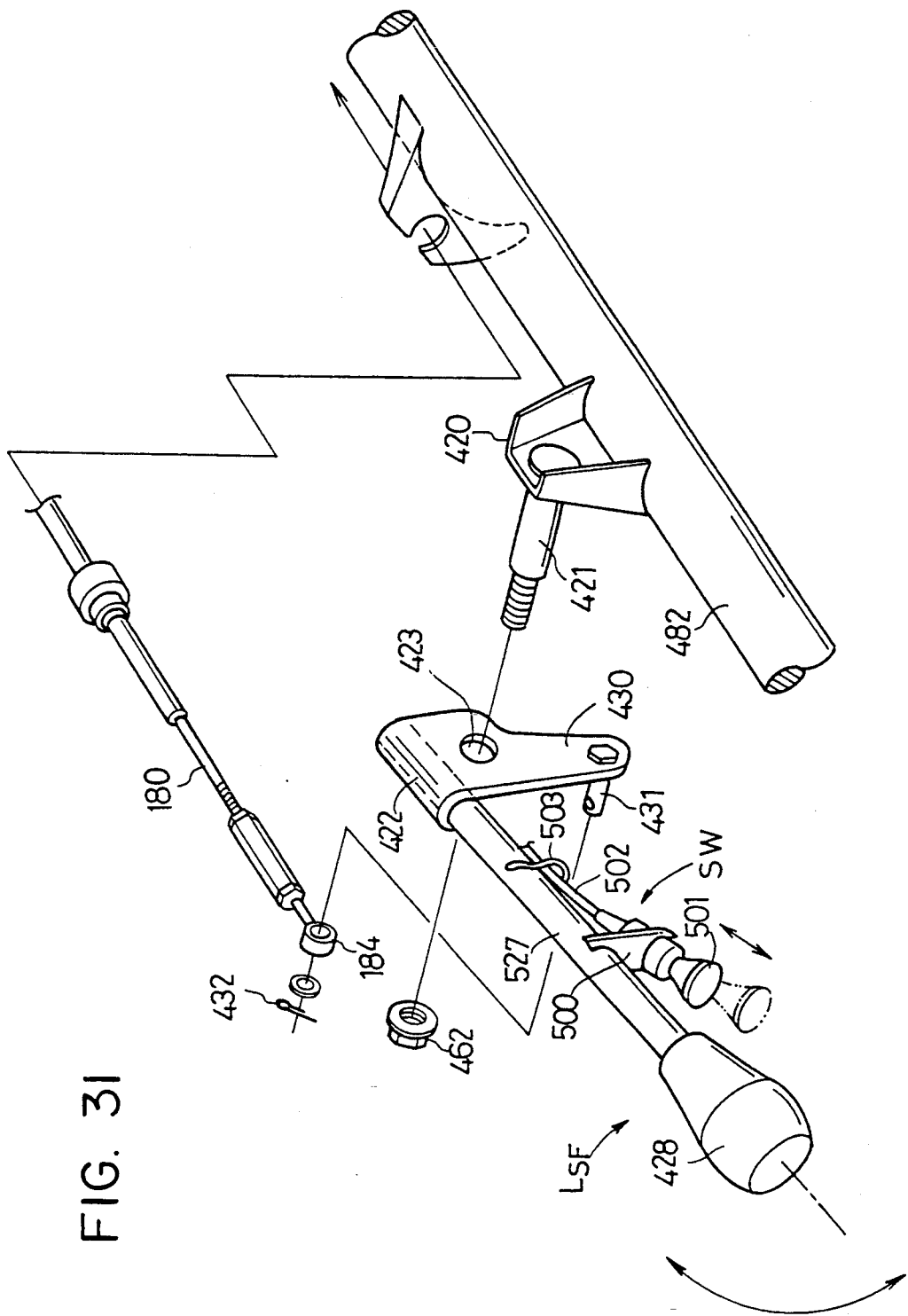
FIG. 31 is an exploded perspective view of an eighth partial modification showing another example of a shift lever.

FIG. 31 illustrates another modification of the shift lever $L_{SF}$ wherein a reverse trigger switch SW is provided for confirming a reverse operation and preventing an irregular operation. The reverse trigger switch SW is integrally mounted on the shift lever $L_{SF}$ in order to be handled by hand. The shift lever $L_{SF}$ is constructed similar to the example in FIG. 30. A reverse knob 501 is mounted on a bracket 500 of an operation rod 527 so as to be pulled forwardly and a reverse cable 502 is connected to the reverse knob 501 at one end thereof. The reverse cable 502 extends through a clamp 503 provided on the operation rod 527 toward the transmission 182 to be connected therewith and normally the knob 501 is elastically biased through the cable 502 to the transmission 182 by a force of a spring provided at the side of the transmission 182. If the reverse knob 501 is pulled forwardly as shown in phantom line as the knob 428 is held in hand, the shift lever $L_{SF}$ is capable of being changed to a reverse side. When the reverse knob 501 is released, it returns automatically to an off position as shown in solid line. Accordingly, in case of the reverse, it is necessary to continue pulling the reverse knob 501 so as to prevent the irregular reverse operation.

Figure 32:
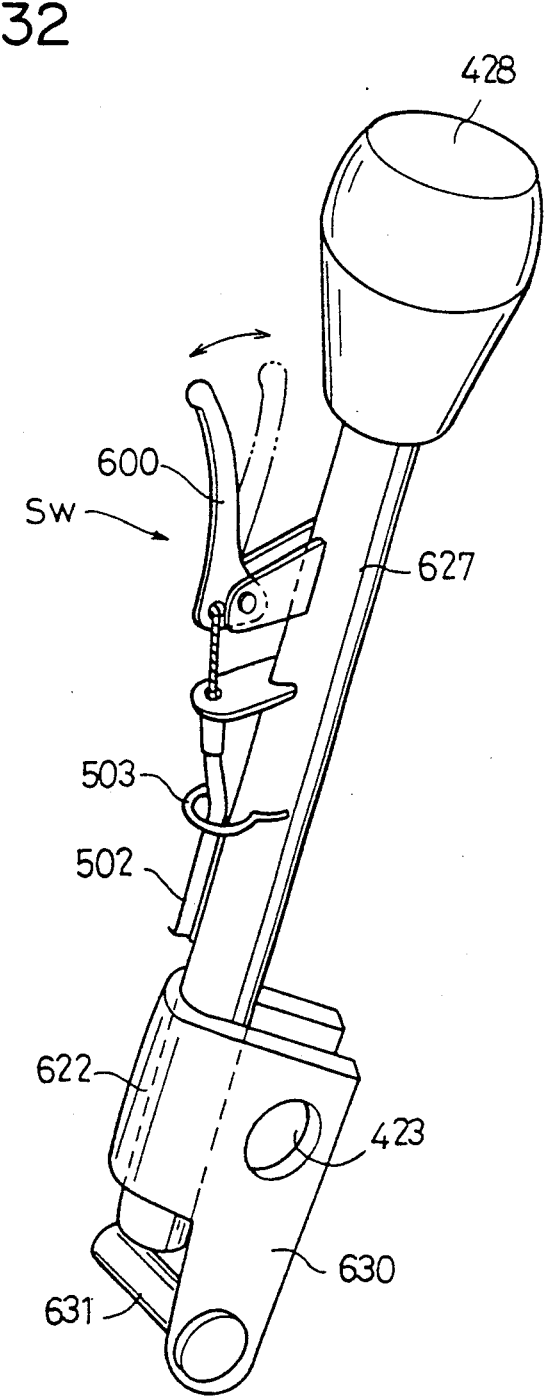
FIG. 32 is a perspective view of a ninth partial modification showing still another example of a shift lever.

FIG. 32 illustrates still another modification of the shift lever $L_{SF}$, wherein a lever 600 is used for operating a reverse switch SW instead of the reverse knob 501 in FIG. 31. An arm 630 of a mounting portion 622 extends along a longitudinally axial direction and is provided at the distal end thereof with a laterally projecting pivot pin 631. In this example, the shift lever $L_{SF}$ extends vertically in an up and down direction but it is also possible to be used by mounting the same in a horizontally extending state.

Figure 33:
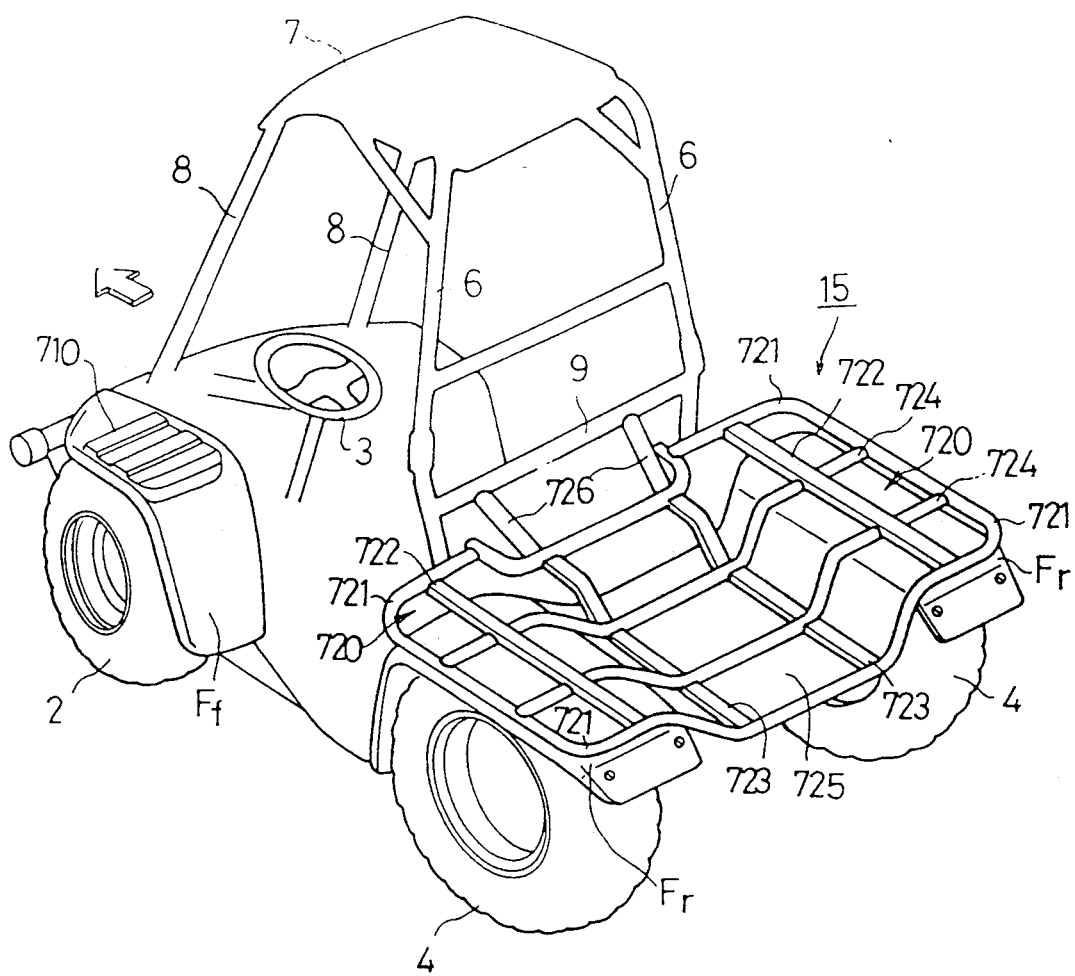
FIG. 33 is a rear schematic perspective view of a tenth partial modification showing principally a carrier construction.
Figure 34:
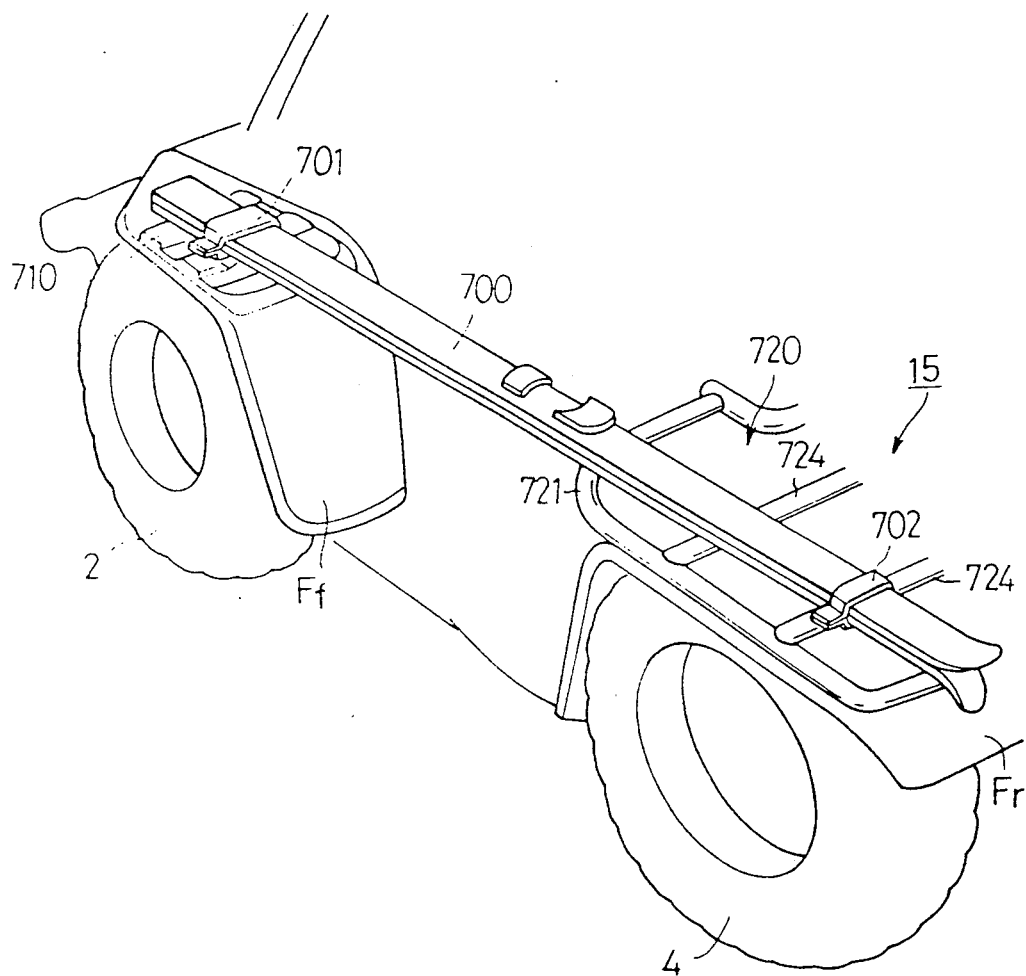
FIG. 34 is an explanatory view showing a carrying state of longer plates.
Figure 35:
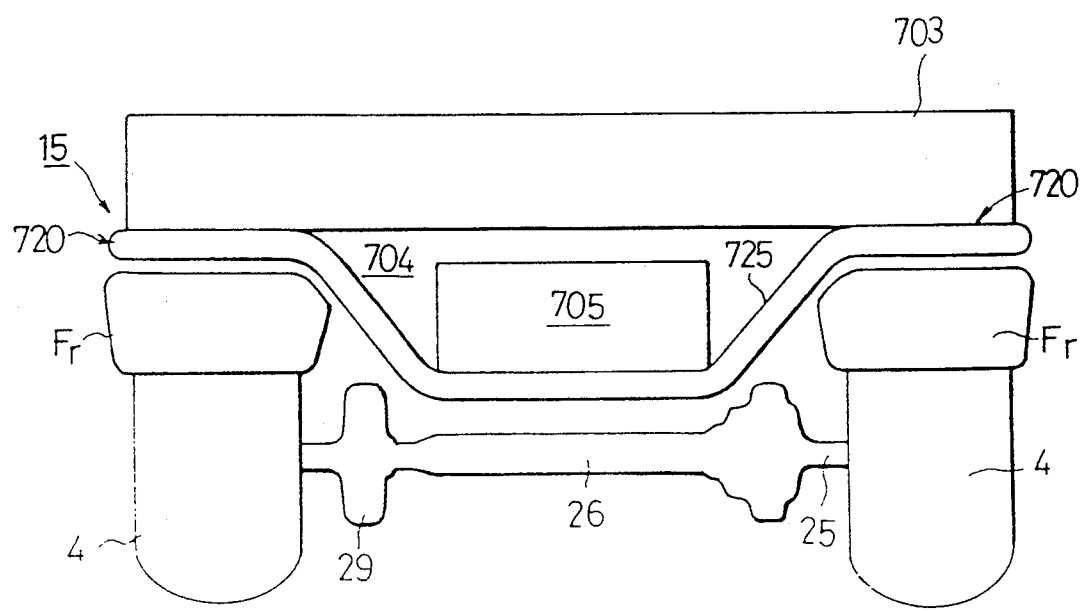
FIG. 35 is a rear schematic view showing a used state of a rear carrier.

FIGS. 33 through 35 illustrate an example of a carrier construction, in which front carriers 710 and 710 are mounted on a pair of right and left front fenders Ff and Ff (the right fender being not shown in the drawing) and a pair of rear fender carriers 720 and 720 are disposed on each of right and left rear fenders Fr and Fr. The rear fender carriers 720 are provided as a part of a rear carrier 15. As seen in FIG. 34, a load of such a long size as a pair of skis is capable of being carried in such a way as to extend over between the left front carrier 710 and the left rear fender carrier 720 and, if necessary, to be fastened with fixing means 701 and 702 such as a band or the like. Thus, the load of a certain length will be steadily carried thereon without projecting out of a contour of the vehicle. In FIG. 33, the rear carrier 15 is formed generally in a rectangular latticed configulation spreading over between the rear fenders 720 and 720 and constituted with an outer frame 721 of a closed loop, longitudinally extending side members 722 and 722 of the right and left rear fender carriers 720 and 720, a pair of center members 723 and 723 extending longitudinally in parallel with each side member 722 at a downward recess 725 formed between the rear wheels 4 and 4, and a pair of parallel cross members 724 and 724 extending transversely to cross each side member 722 and each center member 723. The outer frame 721 is connected at the forward intermediate portion thereof with the cross pipe 9 of the right and left rear roll bars 6 and 6 by a pair of longitudinal joint pipes 726 and 726. As indicated by a reference character G in FIG. 1, a load center of the rear carrier 15 is positioned forwardly of the rear wheel axle 25 whereby the vehicle is assured good balance at the time of travelling with the load on it. FIG. 35 illustrates a state in use of the rear carrier 15. There is carried to be bridged across between the right and left fender carriers 720 and 720 a load 703 which has generally the same length as the width of the rear carrier 15 (hereinafter referred to as "the load of middle size"). A load 705 of short size is housed within a space 704 formed below the load 703 of middle size and above the recess 725. On the rear carrier 15, the load of middle size 703 and the load of short size 705 are thus mounted one over the other so that the rear carrier 15 may carry a lot of loads of various sizes by effectively utilizing the three-dimensional space thereabove. The recess 725 is provided between the rear wheels 4 and 4 without sacrificing an amount of wheel stroke, thereby enabling the height of the rear carrier 15 to be lowered.

Figure 36:
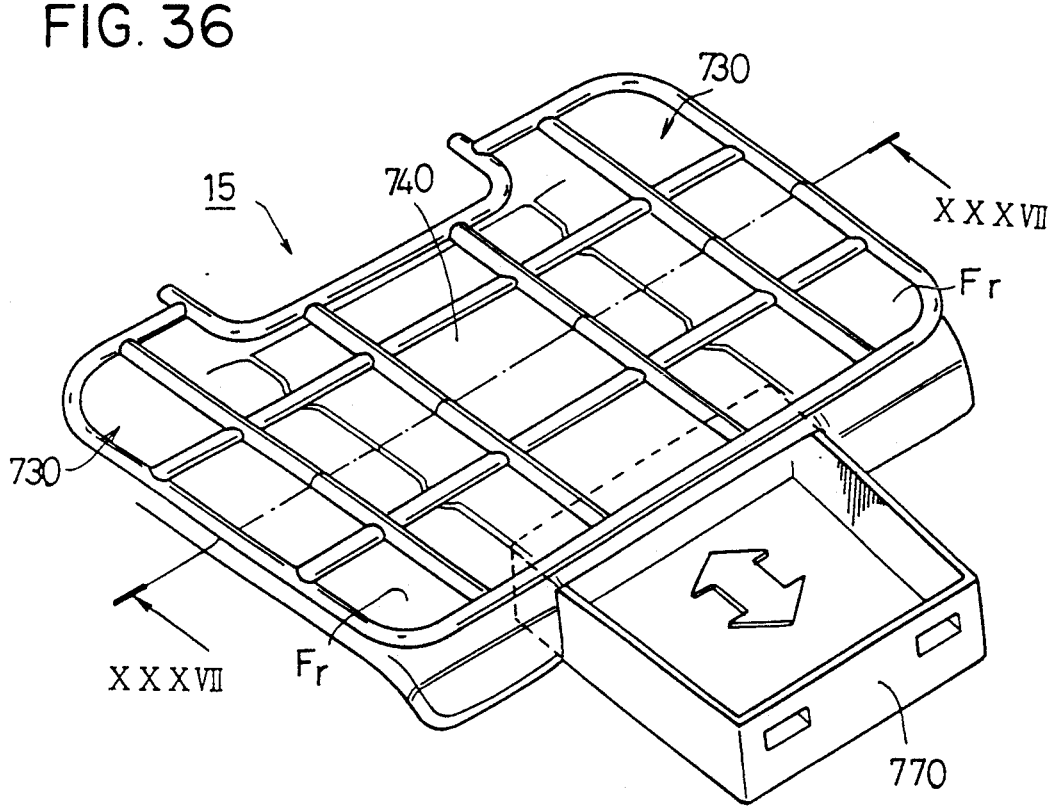
FIG. 36 is a perspective view of an eleventh partial modification showing a rear carrier.
Figure 37:
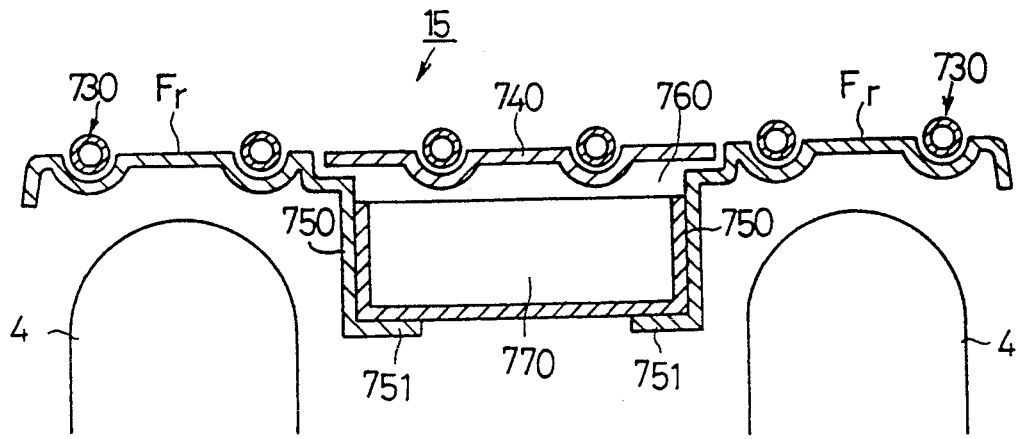
FIG. 37 is a cross sectional view taken along line XXXVII—XXXVII of FIG. 36.

FIGS. 36 and 37 illustrate another example of a rear carrier 15, wherein this rear carrier 15 is formed generally in such a flat configuration that a middle portion is made flush with each of fender carriers 730 and 730. Under the middle of the rear carrier 15 a center fender 740 is integrally provided with each of the rear fenders Fr and Fr to cover a space therebetween. Inner lateral walls 750 and 750 of the right and left rear fenders Fr and Fr extend downwardly inside the rear wheels 4 and 4 and are bent horizontally inwardly to a central longitudinal axis of the vehicle so as to form a space 760 for accommodating articles under the center fender 740. A box 770 like a drawer is housed within the space 760 in an inwardly and outwardly movable fashion.

Figure 38:
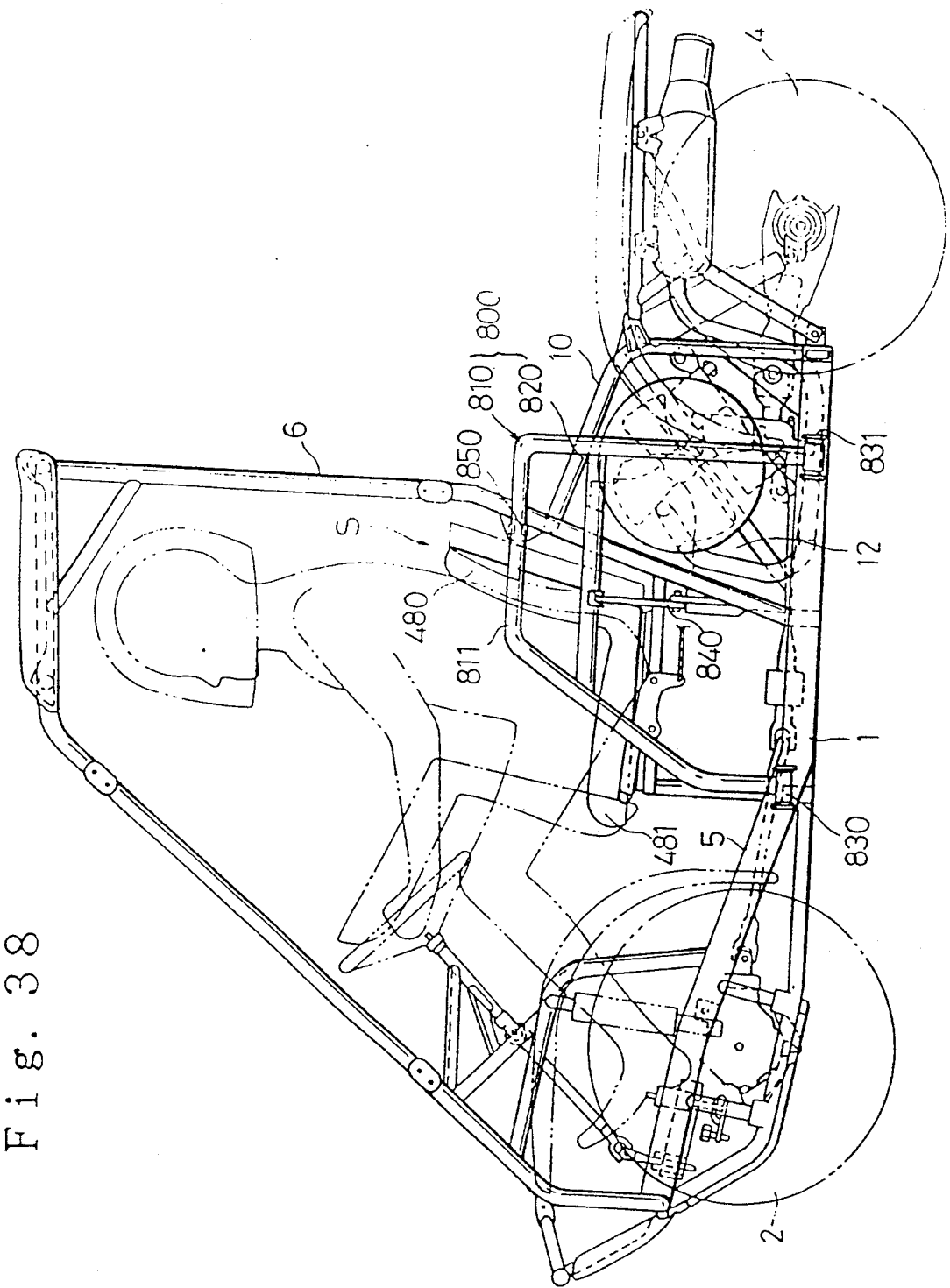
FIG. 38 is a side elevational view of a twelfth partial modification showing a mounting state of a side protector on a four-wheeled buggy.
Figure 39:
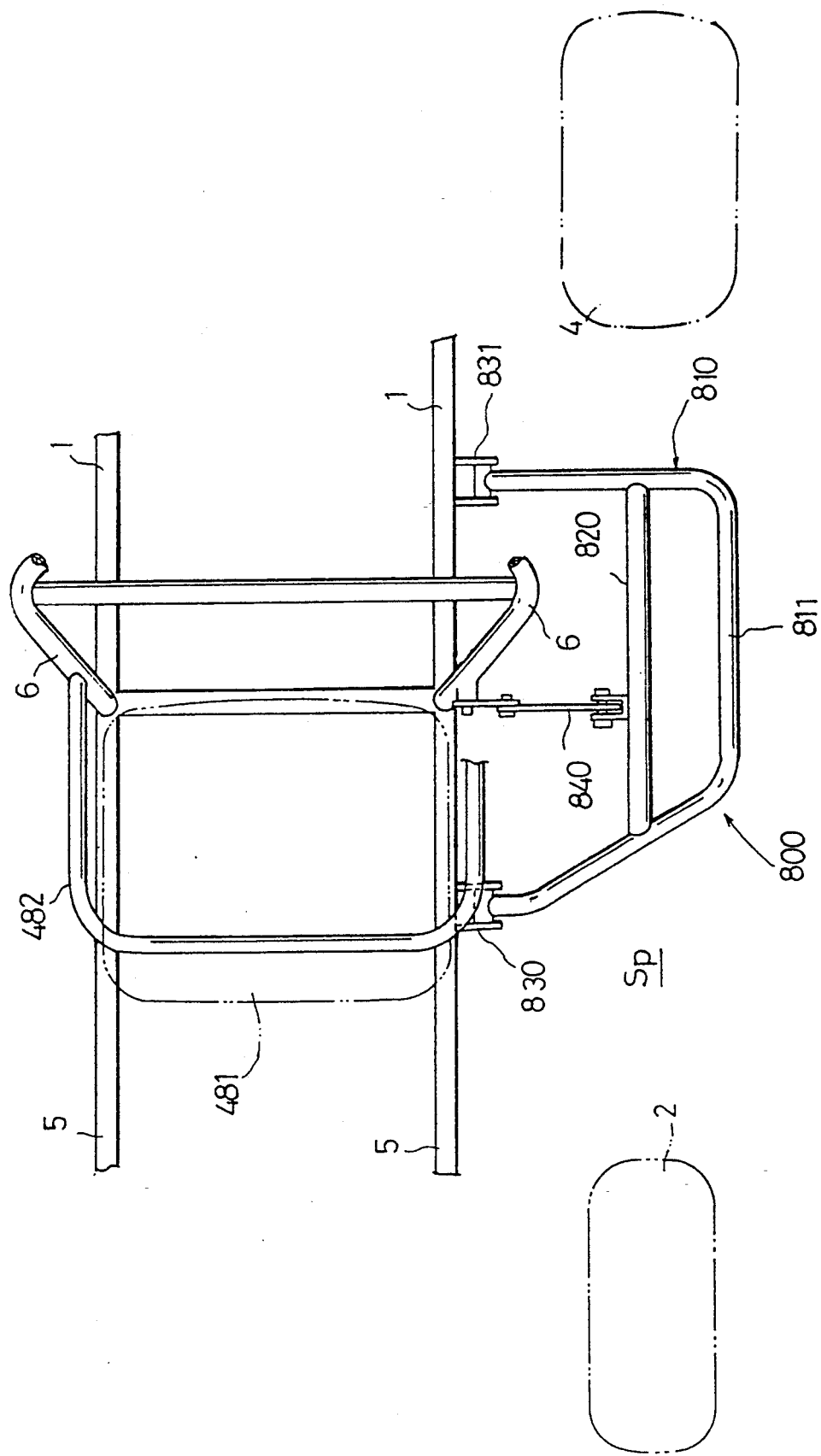
FIG. 39 is a schematic plan view of the side protector shown in its horizontally protruded position.
Figure 40:
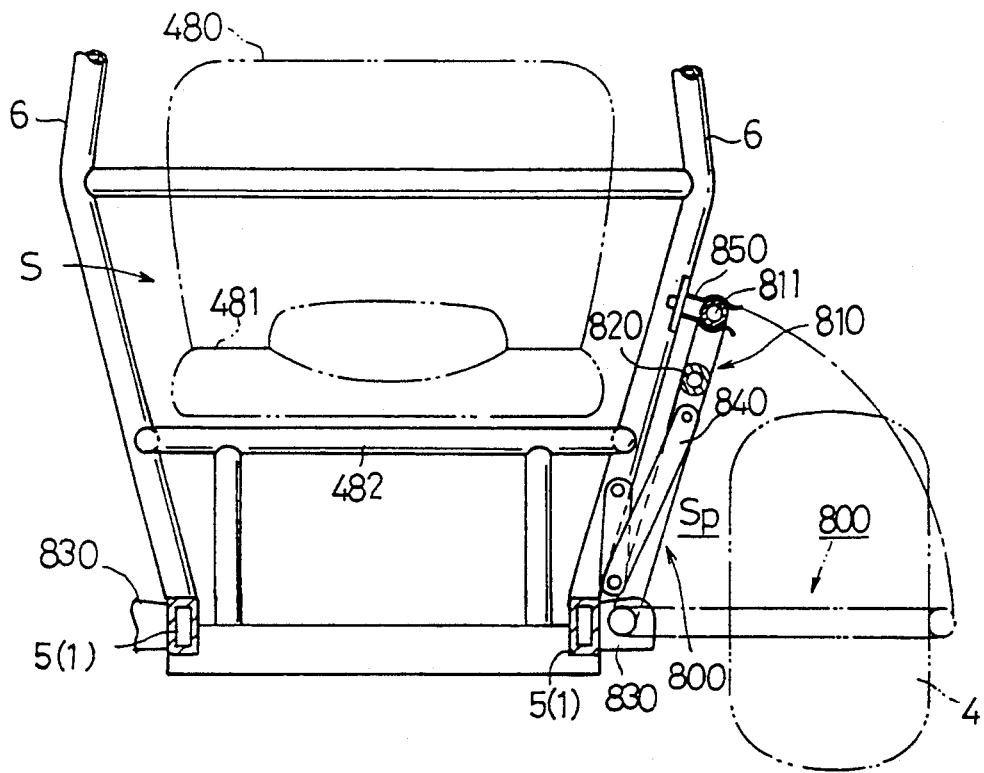
FIG. 40 is a front fragmentary schematic view in which the side protector is shown in a folded standing position.
Figure 41:
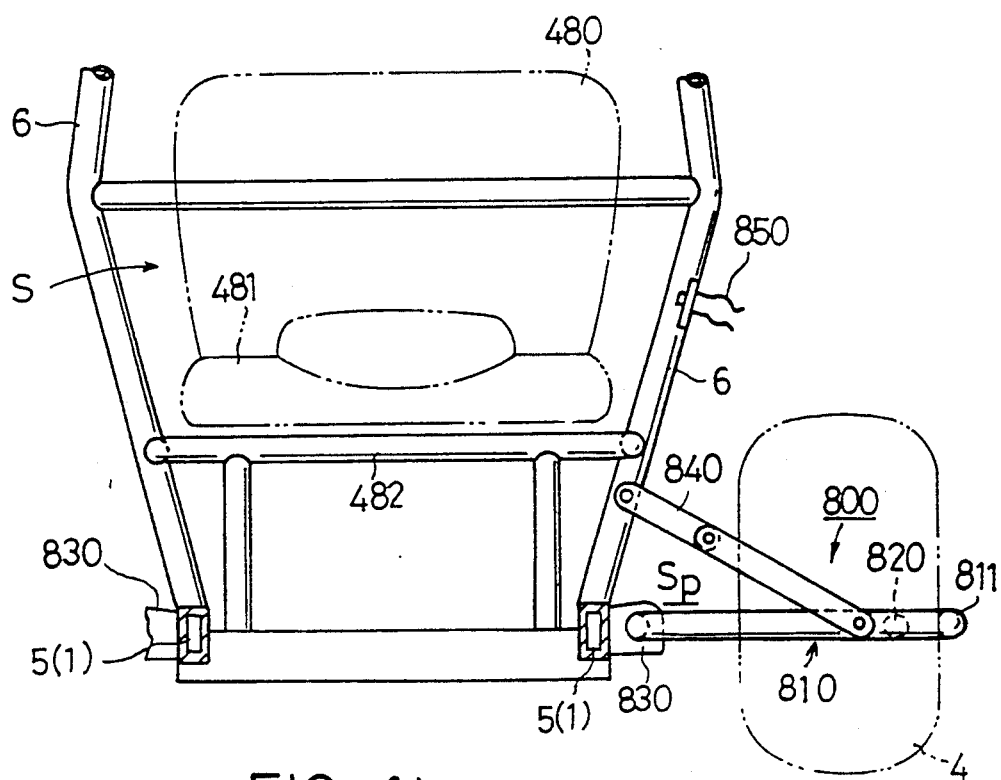
FIG. 41 is a front view similar to FIG. 40 in which the side protector is shown in its horizontally protruded position.

Next, a side protector device will be explained as a twelfth modification with reference to FIGS. 38 through 41 wherein FIG. 38 illustrates a mounting condition of a side protector device on a vehicle similar to that shown in FIG. 1. The side protector device is constituted with a pair of right and left side protectors 800 and 800 (the right one being not shown in the drawing) arranged in a mirror image relationship with each other at the opposite sides of the vehicle. Since these side protectors 800 and 800 are the same in construction, the explanation will be made hereinafter with respect to the left side protector 800. The side protector 800 is pivotally mounted at the side of the seat S on the outer lateral wall of the main frame 1 and formed with an outer frame 810 of generally U-shape, having a rearwardly inclined front side, and a reinforcing pipe 820 longitudinally extending between the front and the rear intermediate points of the outer frame 810. FIG. 38 shows a state in use of the side protector 800 in its standing position in which the outer frame 810 is in an inverted U-shape as viewed from the side thereof and a top pipe 811 thereof extends close to the lateral side of the seat S in parallel and along with the reinforcing pipe 820 in a forward and backward direction of the vehicle so as to cross a seatback 480 at a higher position away from a seat cushion 481. The outer frame 810 is pivoted through the brackets 830, 831 at its both basal ends on front and rear positions of the main frame 1 with respect to the mount portion of the rear roll bar 6. The reinforcing pipe 820 is connected through a twofold hinge 840 to the lower intermediate point of the rear roll bar 6 and the top pipe 811 is held in an engagement with a hook 850 of an elastic material provided on the roll bar 6 at the crossed point therebetween. FIG. 39 is a schematic plan view of the side protector 800 illustrated in its sidewardly projected operative position. A space Sp for getting on and off the vehicle is provided at the lateral side between the front and the rear wheels 2 and 4, and the side protector 800 is protruded sidewardly and outwardly of the vehicle. In the standing position of the side protector 800 as shown in FIGS. 38 and 40, the hinge 840 is folded and the top pipe 811 is held by the hook 800 in such a way that the top pipe 811 and the reinforcing pipe 820 cross the side of the seat S beyond the seat cushion 81. The side protector 800 therefore functions as a guard member at the side of the seat S and as a side bar for the rider while maintaining enough space for getting on and off the vehicle. Further, in the sidewardly projected position of the side protector 800 like FIGS. 39 and 41, the hinge 840 is stretched and the side protector 800 extends in a horizontal plane to be flush with the upper surface of the main frame 1 so that the side protector 800 keeps the rider remote enough from the obstacles such as trees or the like.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A four-wheeled buggy comprising:

a pair of right and left main frames extending substantially in parallel with respect to each other along a central longitudinal axis of a vehicle;

a pair of right and left front wheels operatively supported on a front end of each of said main frames;

a pair of right and left rear wheels operatively supported on a rear end of each of said main frames;

a power unit for driving the vehicle being operatively mounted on said main frames;

a front wheel steering device being disposed adjacent to the front ends of said main frames;

a seat being arranged at approximately a middle portion of said main frames so as to enable an operator to utilize the vehicle in a sitting posture;

a space disposed between said substantially parallel main frames being defined substantially equal in dimension to a lateral width of said seat;

each of said main frames having an angled forward section, said angled forward section being defined as a section of each main frame extending from said front end thereof to a point corresponding to said middle portion thereof where said seat is supported, said main frame having a bend located vertically beneath said seat at said point corresponding to the middle portion; each of said angled forward sections being positioned at said front end thereof above a front wheel axle such that said front wheel axle supports said angled forward section; and each of said main frames having a rearward section, said rearward section being defined as a section of each main frame extending from said point corresponding to said middle portion thereof to said rear end thereof, said rearward section of said main frames extending substantially horizontally to carry said power unit thereon, the pair of said rear wheels being suspended at each lateral side of and in the vicinity of said power unit;

said rearward sections of said main frames being adapted to define a lowermost height of the vehicle relative to the ground.

2. The four-wheeled buggy according to claim 1, wherein a flat step floor extends across between the forward sections of said right and left main frames and a front side of said step floor is positioned at a higher level relative to the ground than a rear thereof.

3. The four-wheeled buggy according to claim 2, wherein a footrest is operatively provided by said front side of said step floor.

4. The four-wheeled buggy according to claim 1, wherein a pair of longitudinally extending sub-frames are provided under the forward sections of said main frames and said front wheel axle is arranged within a space defined with said sub-frames and said main frames.

5. The four-wheeled buggy according to claim 4, wherein said sub-frames define a space disposed therebetween, said space defined by said sub-frames being smaller in dimension than said space disposed between said main frames.

6. The four-wheeled bugger according to claim 5, wherein said front wheels are supported by a suspension device of double wishbone type which has a pair of upper arms mounted on said main frames and a pair of lower arms mounted on said sub-frames.

7. The four-wheeled buggy according to claim 1, wherein a carrier is provided above said rearward sections of said main frames to extend rearwardly from the neighborhood of said seat.

8. A four-wheeled buggy comprising:

a pair of right and left main frames extending substantially in parallel with respect to each other along a central longitudinal axis of a vehicle;

a pair of right and left front wheels operatively supported on a front end of each of said main frames;

a pair of right and left rear wheels operatively supported on a rear end of each of said main frames;

a power unit for driving the vehicle being operatively mounted on said main frames;

a front wheel steering device being disposed adjacent to the front ends of said main frames;

a seat being arranged at approximately a middle portion of said main frames so as to enable an operator to utilize the vehicle in a sitting posture;

a space disposed between said main frames being defined substantially equal in dimension to lateral width of said seat;

each of said main frames having an angled forward section, said angled forward section being defined as a section of each main frame extending from said front end thereof to a point corresponding to said middle portion thereof where said seat is supported, said main frame having a bend located vertically beneath said seat at said point corresponding to the middle portion; each of said angled forward sections being positioned at said front end thereof above a front wheel axle such that said front wheel axle supports said angled forward section; and each of said main frames having a rearward section, said rearward section being defined as a section of each main frame extending from said point corresponding to said middle portion thereof to said rear end thereof, said rearward section of said main frames extending substantially horizontally to carry said power unit thereon, the pair of said rear wheels being suspended at each lateral side of and in the vicinity of said power unit;

said rearward sections of said main frames being adapted to define a lowermost height of the vehicle relative to the ground;

said power unit being an internal combustion engine in which a crankshaft extends substantially in parallel with a central longitudinal axis of the vehicle.

9. The four-wheeled buggy according to claim 8, wherein said internal combustion engine is adapted to drive at least one pair of said front wheels and rear wheels through a front wheel driving apparatus including a front wheel differential device and a rear wheel driving apparatus including a rear wheel differential device.

10. The four-wheeled buggy according to claim 9, wherein said front wheel driving apparatus is supported on the forward sections of said main frames, and a flat step floor is provided above said front wheel driving apparatus to be bridged over between the forward sections of said main frames, a front side of said step floor being positioned at a higher level than a rear side thereof.

11. The four-wheeled buggy according to claim 10, wherein a front differential case of said differential device is arranged under the front side of said step floor whose upper surface is formed into a footrest.

12. The four-wheeled buggy according to claim 11, wherein an upper surface of said front differential case is positioned substantially at the same level as the front side of said step floor which is formed with a partially convex portion for accommodating the upper portion of said front differential case.

13. The four-wheeled buggy according to claim 9, wherein a pair of longitudinally extending sub-frames are arranged under the forward sections of said main frames, and said front differential device and said front wheel axle are arranged within a space defined with said main frames and said sub-frames.

14. The four-wheeled buggy according to claim 13, wherein said front wheel steering device is provided with a steering gearbox which is positioned in front of said front differential device.

15. The four-wheeled buggy according to claim 14, wherein said front wheel steering device is provided with a pair of tie rods operatively connected with said right and left front wheels and are operated through a gear of said steering gearbox, said tie rods being arranged to cross said front wheel axle.

* * * * *